US011832760B2

(12) United States Patent
Montoya et al.

(10) Patent No.: US 11,832,760 B2
(45) Date of Patent: Dec. 5, 2023

(54) ROASTING AND GLAZING METHOD

(71) Applicant: CALICO COTTAGE, INC., Amityville, NY (US)

(72) Inventors: Thomas Montoya, Lindenhurst, NY (US); Mark Wurzel, Brookville, NY (US); David Sank, Asharoken, NY (US); Lawrence Wurzel, Asharoken, NY (US); Steven Nagle, Lindenhurst, NY (US); Robert Delauro, Lindenhurst, NY (US); Barbara Riordan, St. James City, NY (US); Hanif Chung-Ying, Cambria Heights, NY (US); Judith Levin, Huntington, NY (US); Christa Harrison, Bay Shore, NY (US); Andrew Irwin, Ithaca, NY (US); Duane Saxton, Pine City, NY (US); Kevin Blakelock, Elmira, NY (US); Kenneth Antes, Big Flats, NY (US); Mark Whatley, Fayetteville, AR (US); Ronald Beilin, Jupiter, FL (US); Barnett Tessler, New Port Richey, FL (US)

(73) Assignee: CALICO COTTAGE, INC., Amityville, NY (US)

( * ) Notice: Subject to any disclaimer, the term of this patent is extended or adjusted under 35 U.S.C. 154(b) by 0 days.

(21) Appl. No.: 14/974,690

(22) Filed: Dec. 18, 2015

(65) Prior Publication Data

US 2016/0353778 A1    Dec. 8, 2016

Related U.S. Application Data

(62) Division of application No. 14/729,747, filed on Jun. 3, 2015, now abandoned.

(51) Int. Cl.
*A47J 37/06* (2006.01)
*A23N 12/08* (2006.01)
(Continued)

(52) U.S. Cl.
CPC ............... *A47J 37/06* (2013.01); *A23G 3/26* (2013.01); *A23L 5/15* (2016.08); *A23L 29/30* (2016.08);
(Continued)

(58) Field of Classification Search
CPC ...... A23N 12/00; A23N 12/08; A23N 12/083; A23N 12/086; A23N 12/10; A23L 1/364;
(Continued)

(56) References Cited

U.S. PATENT DOCUMENTS 1,002,004 A     8/1911   Skiba
1,304,508 A *   5/1919   Petro ........................... 220/4.21
(Continued)

FOREIGN PATENT DOCUMENTS

CA     2982518 A1   10/2019
EP     0729705 A2    9/1996
(Continued)

OTHER PUBLICATIONS

Krista, "The Basics: How to Make Candied Pecans", retrieved from the Internet (Dec. 2013), http://www.joyfulhealthyeats.com/how-to-make-candied-nuts/.*
(Continued)

*Primary Examiner* — Lien T Tran
*Assistant Examiner* — Tynesha L McClain
(74) *Attorney, Agent, or Firm* — Cowan, Liebowitz & Latman, P.C.; Mark Montague

(57) ABSTRACT

A method of roasting nuts comprises placing water and a mixture of nuts and sugar in a roaster bowl, mixing the water and mixture, heating the roaster bowl during mixing to roast
(Continued)

and sugar coat the nuts, covering the roaster bowl with a cover after roasting and sugar coating, adding water to a reservoir disposed within the cover wherein the reservoir includes at least one metering hole, flowing through the metering hole, from the reservoir to the roaster bowl, the water added to the reservoir, glazing the nuts during the flowing of water into the roaster bowl from the reservoir, and removing the cover from the roaster bowl after glazing the nuts. The measured flow of water through the reservoir results in well coated glazed nuts and prevents the formation of a large burst of steam, thus protecting the operator against being scalded during glazing of the roasted nuts, as well as providing other benefits.

16 Claims, 31 Drawing Sheets

(51) Int. Cl.
| | |
|---|---|
| *A23N 12/10* | (2006.01) |
| *A23G 3/26* | (2006.01) |
| *A47J 27/21* | (2006.01) |
| *A47J 36/00* | (2006.01) |
| *A47J 36/06* | (2006.01) |
| *A47J 36/14* | (2006.01) |
| *A47J 36/16* | (2006.01) |
| *A23L 5/10* | (2016.01) |
| *A23L 29/30* | (2016.01) |
| *A23L 25/00* | (2016.01) |
| *B08B 3/10* | (2006.01) |
| *B08B 9/08* | (2006.01) |
| *B08B 1/00* | (2006.01) |
| *B08B 3/00* | (2006.01) |
| *B08B 9/087* | (2006.01) |

(52) U.S. Cl.
CPC ........... *A23N 12/083* (2013.01); *A23N 12/10* (2013.01); *A47J 27/21175* (2013.01); *A47J 27/21191* (2013.01); *A47J 36/00* (2013.01); *A47J 36/06* (2013.01); *A47J 36/14* (2013.01); *A47J 36/165* (2013.01); *A47J 37/0664* (2013.01); *B08B 1/001* (2013.01); *B08B 3/00* (2013.01); *B08B 3/106* (2013.01); *B08B 9/08* (2013.01); *B08B 9/087* (2013.01); *A23L 5/10* (2016.08); *A23L 25/00* (2016.08); *A23L 25/25* (2016.08); *A23V 2002/00* (2013.01); *B08B 2230/01* (2013.01)

(58) Field of Classification Search
CPC ... A23L 5/15; A23L 5/10; A23L 29/30; A23L 25/00; A23L 25/25; A47J 37/06; A47J 27/21175; A47J 27/21191; A47J 36/00; A47J 36/06; A47J 36/14; A47J 36/165; A23G 3/26; B08B 1/001; B08B 3/00; B08B 3/106; B08B 9/08; B08B 9/087; B08B 2230/01; A23V 2002/00

See application file for complete search history.

(56) References Cited

U.S. PATENT DOCUMENTS

| | | | |
|---|---|---|---|
| 1,377,258 A * | 5/1921 | Lame | A47J 37/10 99/425 |
| 1,380,656 A | 6/1921 | Clarence | |
| 1,428,604 A | 9/1922 | Merrill | |
| 1,430,012 A | 9/1922 | Heiser | |
| 1,432,407 A | 10/1922 | Mieville | |
| 1,449,687 A | 3/1923 | Marfisi | |
| 1,602,053 A | 10/1926 | Boyle | |
| 1,843,131 A | 2/1932 | Howson | |
| 2,006,704 A | 7/1935 | Muffling | |
| 2,010,582 A | 8/1935 | Burns | |
| 2,505,967 A * | 5/1950 | Humphrey | A23L 7/187 366/248 |
| 2,905,452 A | 9/1959 | Appleton | |
| 3,068,912 A | 12/1962 | Shaw | |
| 3,229,867 A | 1/1966 | Sunao | |
| 3,596,590 A | 8/1971 | Harris | |
| 3,657,993 A | 4/1972 | Close | |
| 3,744,400 A | 7/1973 | Woodruff | |
| 3,797,377 A | 3/1974 | Lotter | |
| 3,884,135 A | 5/1975 | Lohr | |
| 3,921,683 A | 11/1975 | Vegh | |
| 4,075,939 A * | 2/1978 | Horn | A47J 27/04 222/510 |
| 4,141,287 A | 2/1979 | Becker | |
| 4,167,900 A | 9/1979 | Eichler | |
| 4,301,717 A | 11/1981 | Knees | |
| 4,417,506 A | 11/1983 | Herbst | |
| 4,512,497 A | 4/1985 | Grusin | |
| 4,647,463 A | 3/1987 | Hoover | |
| 4,773,317 A | 9/1988 | Wickboldt, Jr. | |
| 4,796,776 A | 1/1989 | Dalquist et al. | |
| 4,828,140 A | 5/1989 | Henderson | |
| 5,386,102 A | 1/1995 | Takikawa | |
| 5,388,732 A * | 2/1995 | Greger | A47J 36/08 210/467 |
| 5,512,733 A | 4/1996 | Takikawa | |
| 5,547,112 A | 8/1996 | Schiffer | |
| 5,611,264 A | 3/1997 | Studer | |
| 5,619,983 A | 4/1997 | Smith | |
| 5,639,023 A | 6/1997 | Hild et al. | |
| 5,653,881 A | 8/1997 | Bruss | |
| 5,857,403 A | 1/1999 | Mann | |
| 5,941,427 A | 8/1999 | Speer | |
| 6,026,735 A | 2/2000 | Waterworth | |
| 6,082,248 A | 7/2000 | Turrel | |
| 6,283,625 B2 | 9/2001 | Frankel | |
| 6,427,879 B1 | 8/2002 | Caldwell | |
| 6,499,391 B1 | 12/2002 | Su | |
| 6,711,989 B1 | 3/2004 | Sarnoff | |
| 6,845,707 B1 | 1/2005 | Xu | |
| 6,942,119 B2 | 9/2005 | Christos | |
| 7,485,830 B2 | 2/2009 | Wang | |
| 7,619,188 B2 | 11/2009 | Oghafua | |
| 7,780,337 B2 | 8/2010 | Peng | |
| 7,993,694 B2 | 8/2011 | Goderiaux | |
| 8,087,407 B2 | 1/2012 | Wiker et al. | |
| 8,302,527 B2 | 11/2012 | Heitmann et al. | |
| 8,434,403 B1 * | 5/2013 | Cloutier | A23L 1/18 366/247 |
| 8,707,862 B1 | 4/2014 | Oliver | |
| 8,931,401 B2 | 1/2015 | Cheung | |
| 9,549,570 B2 | 1/2017 | Montoya et al. | |
| 9,578,987 B2 | 2/2017 | Montoya et al. | |
| 9,642,392 B2 | 5/2017 | Montoya et al. | |
| 10,238,138 B2 | 3/2019 | Montoya et al. | |
| 10,299,505 B2 | 5/2019 | Montoya et al. | |
| 2001/0002891 A1 | 6/2001 | Frankel | |
| 2004/0159244 A1 | 8/2004 | Leason | |
| 2004/0250690 A1 | 12/2004 | Restis | |
| 2005/0120884 A1 | 6/2005 | Kerner | |
| 2005/0122835 A1 | 6/2005 | Nussbaum | |
| 2005/0150823 A1 | 7/2005 | Eserkaln | |
| 2005/0223906 A1 | 10/2005 | Xu | |
| 2006/0070529 A1 | 4/2006 | Kim | |
| 2006/0201335 A1 | 9/2006 | Kim | |
| 2006/0219100 A1 | 10/2006 | Gelfand | |
| 2007/0006738 A1 | 1/2007 | Beesley | |
| 2008/0257168 A1 | 10/2008 | Wolfe | |
| 2008/0308547 A1 | 12/2008 | Zhang et al. | |
| 2009/0159607 A1 | 6/2009 | Kratzer | |
| 2010/0107886 A1 | 5/2010 | Xiao et al. | |
| 2011/0089156 A1 | 4/2011 | Santacatterina et al. | |
| 2011/0185917 A1 | 8/2011 | Goderiaux | |
| 2012/0073450 A1 | 3/2012 | Constans | |
| 2014/0069282 A1 | 3/2014 | He | |

(56) References Cited

U.S. PATENT DOCUMENTS

| | | |
|---|---|---|
| 2014/0116262 A1 | 5/2014 | Cheung |
| 2014/0245900 A1 | 9/2014 | Conti |
| 2015/0182070 A1 | 7/2015 | Leijenaar |
| 2015/0201787 A1 | 7/2015 | Holzbauer |
| 2015/0292750 A1 | 10/2015 | Delrue |
| 2015/0342388 A1 | 12/2015 | Wu |
| 2016/0353923 A1 | 1/2016 | Montoya et al. |
| 2016/0353925 A1 | 1/2016 | Montoya et al. |

FOREIGN PATENT DOCUMENTS

| | | | |
|---|---|---|---|
| EP | 2478781 A1 | 7/2012 | |
| GB | 1017582 A * | 1/1966 | .............. A47J 36/06 |
| RU | 2142728 C1 | 12/1999 | |
| WO | WO 9428778 A1 * | 12/1994 | .............. A47J 36/08 |
| WO | 2008087622 A2 | 7/2008 | |
| WO | 2016/196796 A1 | 12/2016 | |

OTHER PUBLICATIONS

Gold Medal Concessions Equipment & Supplies Listing from catalog Gold Medal Products Co.; 8 pages; 2012.

Gold Medal Pralinator Models 2180EL, 2180ER, 2181EL, 2181ER, 2181DEL & 2181DER Instruction Manual for Domestic Electronic Models Manufactured after Sep. 2004; 17 pages; www.concessionstands.com; 2013.

German Nut Roasters, Inc. Installation Mandelprofi Mini/Electric; 3 pages; 2010.

German Nut Roasters, Inc. Mandelprofi off their website; 2 pages; 2010.

German Nut Roasters, "Madelprofi" Mini table top Machine sheet; 1 page; 2010.

German Nut Roasters, pricing all models sheet; 1 page; www.nutroastingmachine.com; 2010.

The Nutty Bavarian—Compare Nut Roasters; 2 pages; www.nuttyb.com; 1997.

Nutty Bavarian, NBR2000 Plus—Operations and Training Manual; www.nuttyb.com; 15 pages; revised Jul. 1, 2008.

The above reference was cited in an office action of co-pendng U.S. Appl. No. 14/950,663, dated Nov. 9, 2016.

The above references references were cited in ISR and Written Opinion of co-pending PCT application—PCT/US2016/035522, dated Aug. 18, 2016—dated Sep. 15, 2016.

http://www.joyfulhealthyeats.com; (Krista) The Basics How To Make Candied Pecans/Fall Recipes; Dec. 2013; 10 pages; Mar. 26, 2016. Cited in co-pending U.S. Appl. No. 14/974,690.

The references were cited in an Office Action dated Dec. 27, 2016 for co-pending U.S. Appl. No. 14/729,747.

* cited by examiner

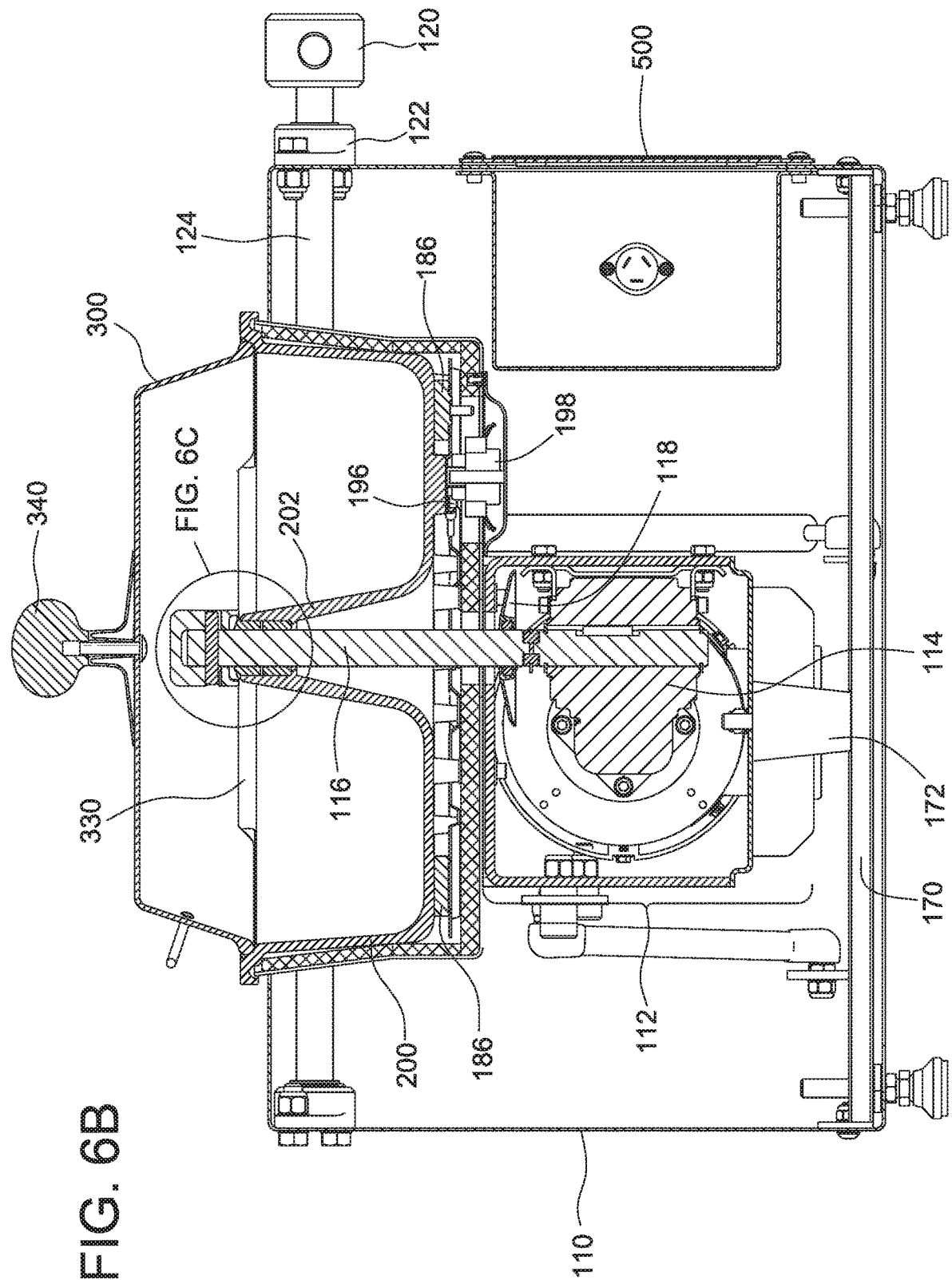

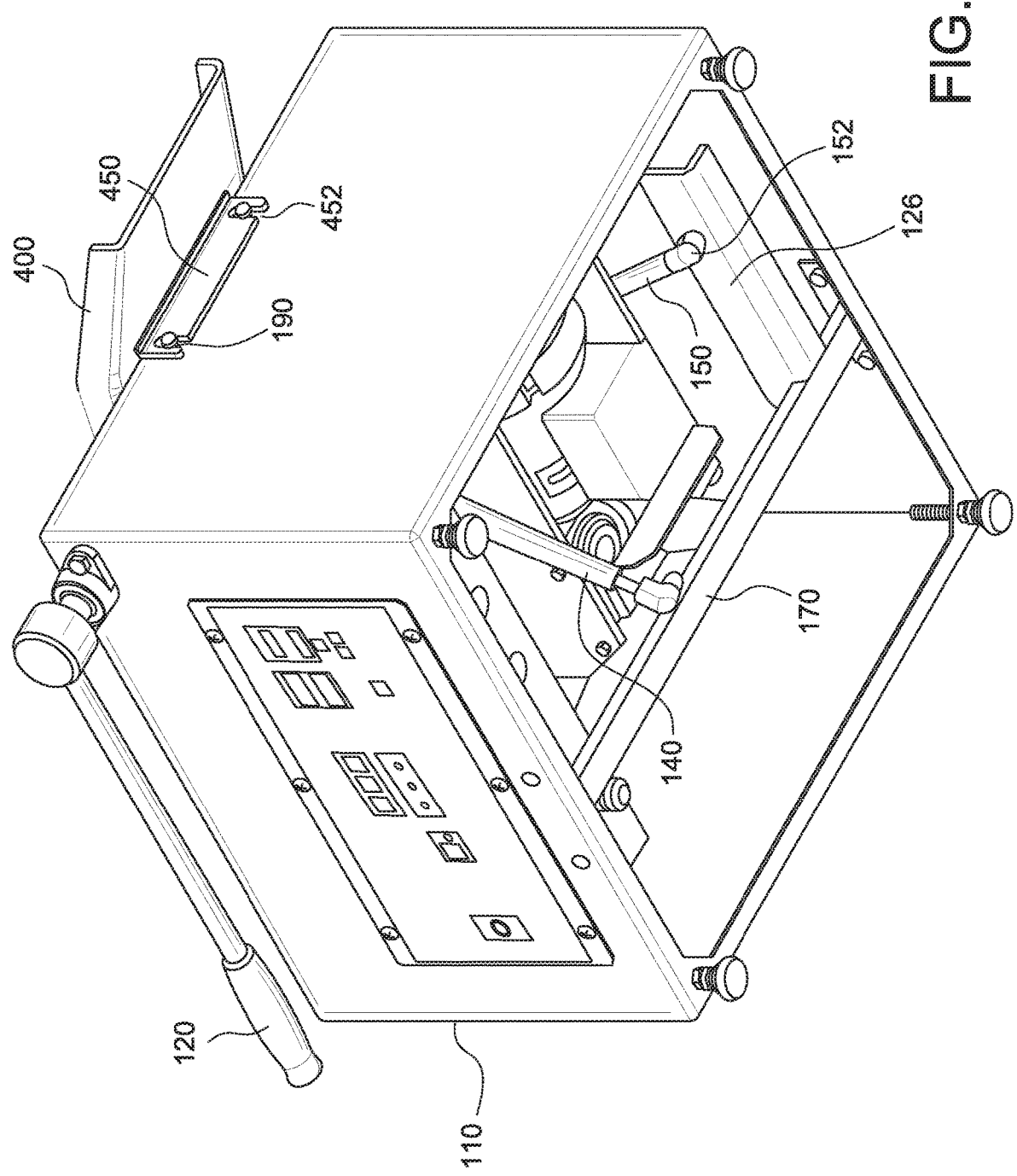

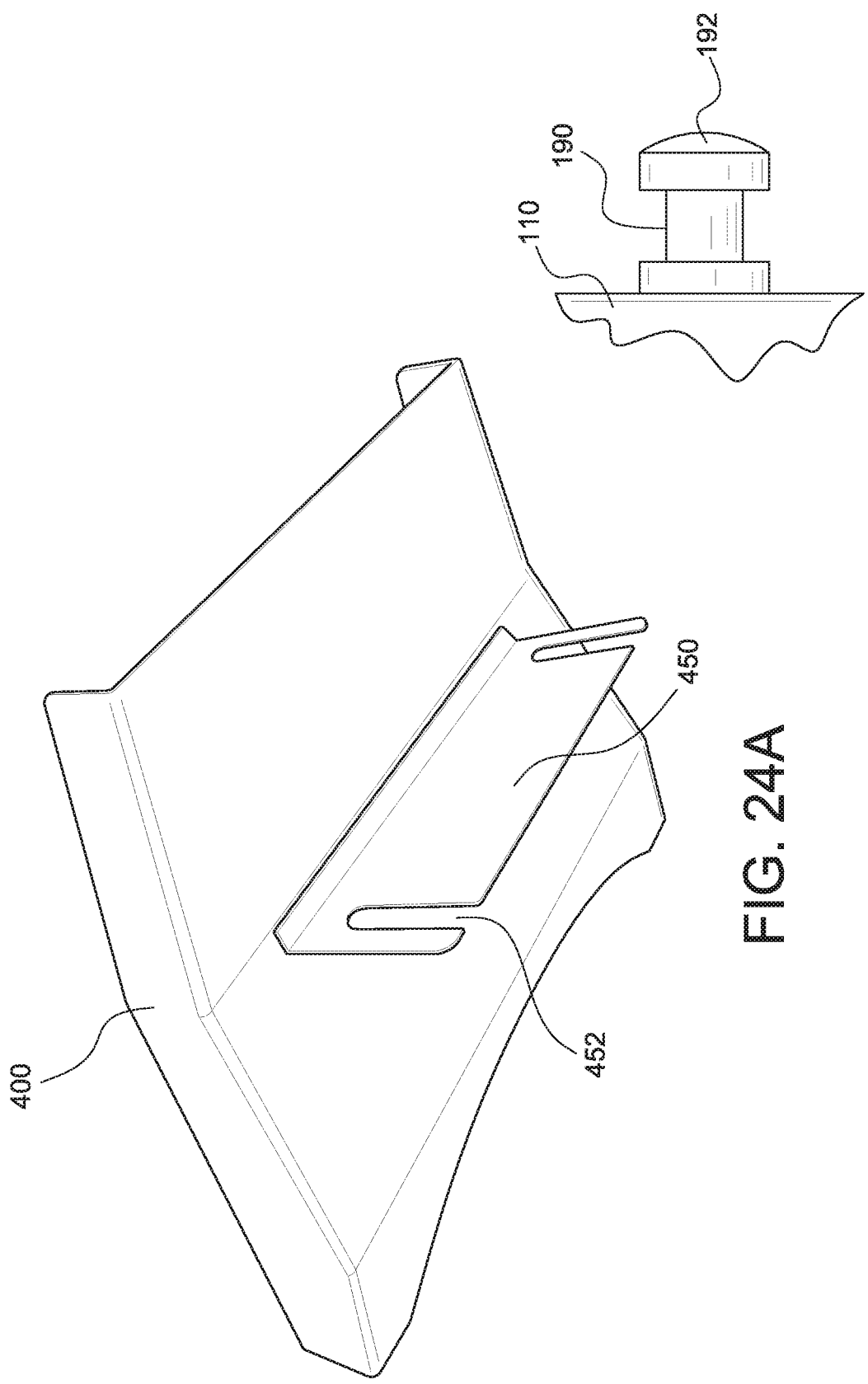

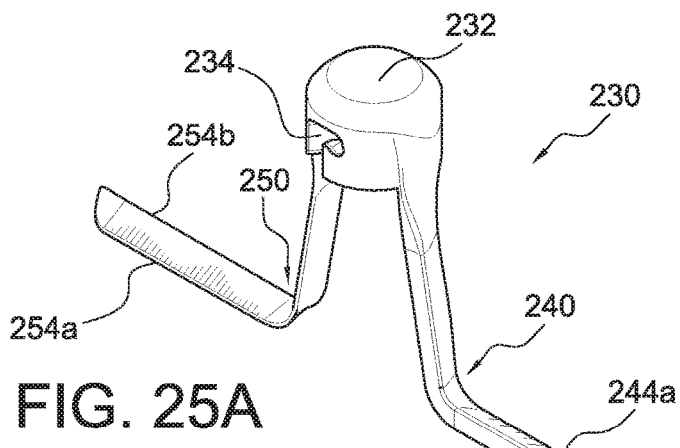
FIG. 25A
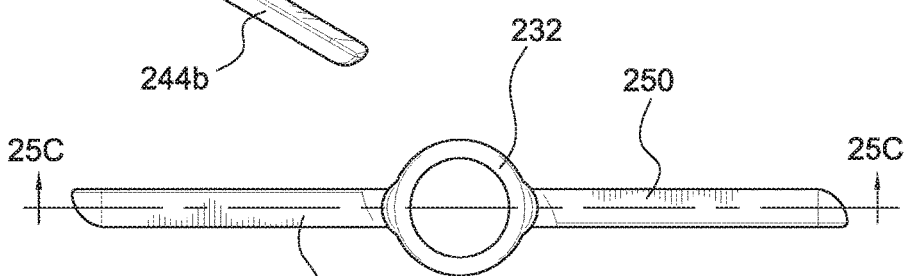
FIG. 25B
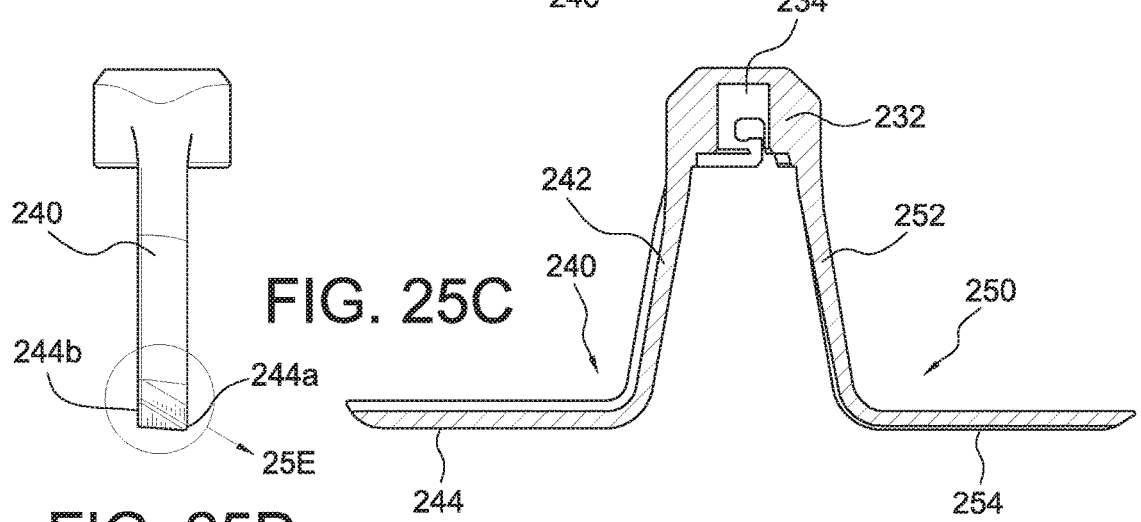
FIG. 25C
FIG. 25D
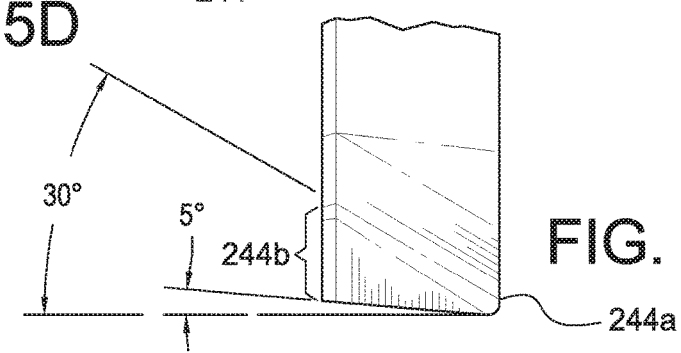
FIG. 25E

ROASTING AND GLAZING METHOD

REFERENCE TO RELATED APPLICATION

This is a division of U.S. patent application Ser. No. 14/729,747, filed Jun. 3, 2015 now abandoned, the entire disclosure of which is incorporated herein by reference.

BACKGROUND OF THE INVENTION

1. Field of the Invention

The present invention relates generally to a roasting and glazing apparatus and a method of roasting/glazing and, more particularly, to an apparatus and method that have various novel and advantageous features directed to both safety and performance.

2. Description of the Related Art

Roasted and/or glazed nuts can be made in a variety of manners and using a variety of types of equipment. Available equipment, however, is either cumbersome to use or unsafe in various respects, or both. For instance, it may be difficult and/or unsafe to empty the finished product from a very large, typically heavy cooking bowl into a tray or other bowl for subsequent handling. In particular, a heavy bowl may require two people to safely lift and then be turned to empty its contents. In some machines, the bowl can be lifted by raising a handle, but the bowl can quickly drop if the user accidentally lets go of the handle.

As another example, the addition of water during a nut glazing step often results in the creation of a large burst of steam that may burn the operator if appropriate precautions are not taken. In some instances, the operator must be reasonably skilled to avoid being burned.

In addition, it always is desirable to minimize waste or scrap. In nut roasting/glazing, scrap are pieces of sugar that have binded together to form a ball, sometimes called a sugar ball. Sugar balls are very hard and could break a tooth if bitten. As a result, sugar balls within a batch of roasted/glazed nuts should be discarded, which increases time and expense. Sugar balls vary in size, but generally have a size (width) of between 2.0 mm (about 0.079 inches) and 2.5 cm (about 0.98 inches), but sometimes are even bigger.

Still further, to clean the cooking bowl, water typically is added to the bowl and then heated to melt and dissolve all of the remaining sugar. Then, the now-heated water, along with the dissolved sugar, is poured out. While effective to clean the bowl, removing the water with the dissolved sugar (called herein, for convenience, "sugar water") may be cumbersome.

Additionally, in the glazing and/or cleaning processes of certain machines, a relatively substantial amount of sugar water is converted into steam that escapes into the air, which disadvantageously causes surrounding surfaces to be coated with sugar.

OBJECTS AND SUMMARY OF THE INVENTION

In view of the foregoing, it is an object of the present invention to provide a roasting and glazing apparatus that produces high quality roasted/glazed nuts.

It is a further object of the present invention to provide a roasting and glazing apparatus that is easy and safe to operate. In particular, it is an object to provide a machine that is simple enough to use to allow a non-highly skilled person to properly and safely operate it.

It is yet a further object of the present invention to provide a roasting and glazing apparatus that enables the operator to easily and safely empty the unit's roaster bowl upon completing a batch of roasted/glazed nuts.

It is yet an additional object of the present invention to provide a roasting and glazing apparatus that is designed to minimize the accidental falling of a raised roaster bowl.

It is another object of the present invention to provide a roasting and glazing apparatus that is designed to prevent the operator or another individual from being scalded by any steam that is created during either the cooking or cleaning processes.

It is yet a further object of the present invention to provide a roasting and glazing apparatus that produces roasted and glazed nuts with minimal waste or scrap.

It is yet another object of the present invention to provide a roasting and glazing apparatus that produces nuts that are well coated and glazed.

It is still yet a further object of the present invention to provide a roasting and glazing apparatus that is easy to clean.

It is still yet another object of the present invention to provide a roasting and glazing apparatus that minimizes or otherwise reduces the dispersion of sugar-laden steam during glazing and cleaning, thus preventing potential damage to machine components, shelves and items located in the vicinity of the machine, and significantly minimizing cleanup of surfaces and items in the surrounding area that otherwise would be laden with sugar.

To achieve one or more of the foregoing and other objects, the present invention, in accordance with certain embodiments of the invention, is a roasting and glazing apparatus/assembly comprising a roaster housing, a roaster bowl at least partially contained within the roaster housing, an agitator rotatably mounted within the roaster bowl and including blades adapted to mix a mixture of nuts (or another food item) and sugar (or other appropriate coating), along with optional spices or other flavorings/ingredients, during a cooking/roasting operation of the roaster assembly, a heater controlled to heat the roaster bowl during the cooking/roasting operation, and a cover removably mounted on the roaster bowl, sized to at least partially cover the roaster bowl, and including a reservoir for water disposed within the top surface of the cover, the reservoir including at least one metering hole adapted to cause water added to the reservoir to flow into the roaster bowl at a predetermined rate of flow during a glazing operation of the machine.

As an aspect of the invention, the cover includes a rolled edge that extends partially, but not fully, around the bottom of the cover. The roaster bowl includes a channel that extends at least partially around a top surface of the roaster bowl and is sized to receive the rolled edge of the cover when mounted on the roaster bowl. A vent extends between the roaster bowl and the cover to a location of the cover that does not include the rolled edge.

As a feature of this aspect, the vent extends between the roaster bowl and the cover for a distance that corresponds to at least 15% of the perimeter of the bottom of the side surface of the cover.

As another aspect of the invention, the predetermined rate of flow corresponds to a flow of 3 ounces of water over a period of at least 10 seconds. In a variation, the predetermined rate of flow corresponds to a flow of 3 ounces of water over a period of between 30 and 35 seconds. Other amounts of water and flow rates may be utilized.

As a further aspect of the invention, the reservoir within the top surface of the cover includes at least first and second metering holes, the first metering hole disposed at a first end of the reservoir and the second metering hole disposed at a second end of the reservoir.

As a feature of this aspect, the first and second metering holes are disposed on opposite ends of the reservoir, and the reservoir includes a third metering hole disposed substantially half-way between the first and second metering holes within the reservoir.

As an additional aspect of the invention, the reservoir is disposed in the cover at a location that is diametrically opposed to the location of the vent.

As a feature of this aspect, a handle is coupled to and extends upwards from a center of the cover, and the handle is disposed substantially mid-way between the reservoir and the vent.

As yet another aspect of the invention, the roaster bowl includes a pouring lip that extends partially around the upper perimeter of the roaster bowl. As a particular example, the pouring lip extends about 20% of the bowl's perimeter.

As a feature of this aspect, the vent is disposed immediately above the pouring lip of the roaster bowl.

As another feature of this aspect, the apparatus/assembly further comprises a cantilever arm that is coupled to the roaster bowl and is adapted/designed to raise the roaster bowl to a position sufficiently high to cause the roasted/ glazed nuts (or other roasted and/or glazed food item) within the roaster bowl to pour over the pouring lip and out of the roaster bowl.

These and other embodiments, aspects and features of the roasting and glazing apparatus/assembly of the present invention are described in the following detailed description.

In accordance with further embodiments of the invention, a method of roasting and glazing nuts (or other food item) comprises placing water (or other liquid) and a mixture of nuts (or other food item), sugar (or other appropriate coating) and possibly other ingredients, such as spices, in a roaster bowl, mixing the water (or other liquid) and the mixture in the roaster bowl, heating the roaster bowl to roast and sugar coat the nuts, covering the roaster bowl with a cover after the nuts are roasted and sugar coated, adding water to a reservoir disposed within the cover while it is covering the roaster bowl, flowing the water added to the reservoir through a metering hole (or holes) in the reservoir into the roaster bowl, glazing the nuts due to the water flowing into the roaster bowl from the reservoir, and removing the cover from the roaster bowl after the nuts are glazed.

As an aspect of the method embodiments, the method comprises converting into steam, within the roaster bowl, at least some of the water flowing from the reservoir, and venting at least some of the steam through a steam vent extending between the roaster bowl and the cover.

As a feature of this aspect, the flowing step is carried out at a rate corresponding to a flow of 3 ounces of water over a period of at least 10 seconds. In a variation, the flowing step is carried out at a rate corresponding to a flow of 3 ounces of water over a period of between 30 and 35 seconds. Other amounts of water and flow rates may be utilized. The flowing step produces very well coated glazed nuts as a result of the period of time during which the water flows from the reservoir into the roaster bowl.

As a feature of this feature, water is converted into steam at a rate corresponding to the rate of flow of the water from the reservoir into the roaster bowl.

As another aspect of the method embodiments, the venting step entails venting at least some of the steam through a steam vent disposed at a location of the cover diametrically opposed to a location at which the reservoir is disposed within the cover.

As a feature of this aspect, the method further comprises holding by a hand of an operator a top handle located at a center of the cover while the adding water step is carried out, the top handle being disposed sufficiently far from the steam vent to avoid scalding of the hand by the steam vented through the steam vent.

As a further aspect of the method embodiments, the method further comprises raising the roaster bowl sufficient to cause the glazed nuts within the roaster bowl to pour over a pouring lip of the roaster bowl.

As yet another aspect, the heating step includes melting the sugar in the roaster bowl and adhering the melted sugar to the nuts.

These and other embodiments, aspects and features of the present invention are described in the following detailed description.

In addition, various other objects, advantages and features of the present invention will become readily apparent to those of ordinary skill in the art from the following detailed description of the invention.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIGS. 6A and 6B are schematic illustrations of cross-sectional views of the roasting and glazing apparatus/assembly of the present invention;

FIGS. 17-22 are schematic illustrations showing various components within the roaster housing and used to illustrate the non-linear dampening system of the present invention;

FIG. 24A is a schematic illustration of a perspective, bottom view of the pour tray of the present invention;

FIG. 24B is a schematic illustration of a mounting peg used to mount the pour tray on the roaster housing in accordance with the present invention;

FIGS. 25A-25G are schematic illustrations showing various views of the roaster bowl agitator of the present invention;

DETAILED DESCRIPTION OF INVENTION

Figure 1:
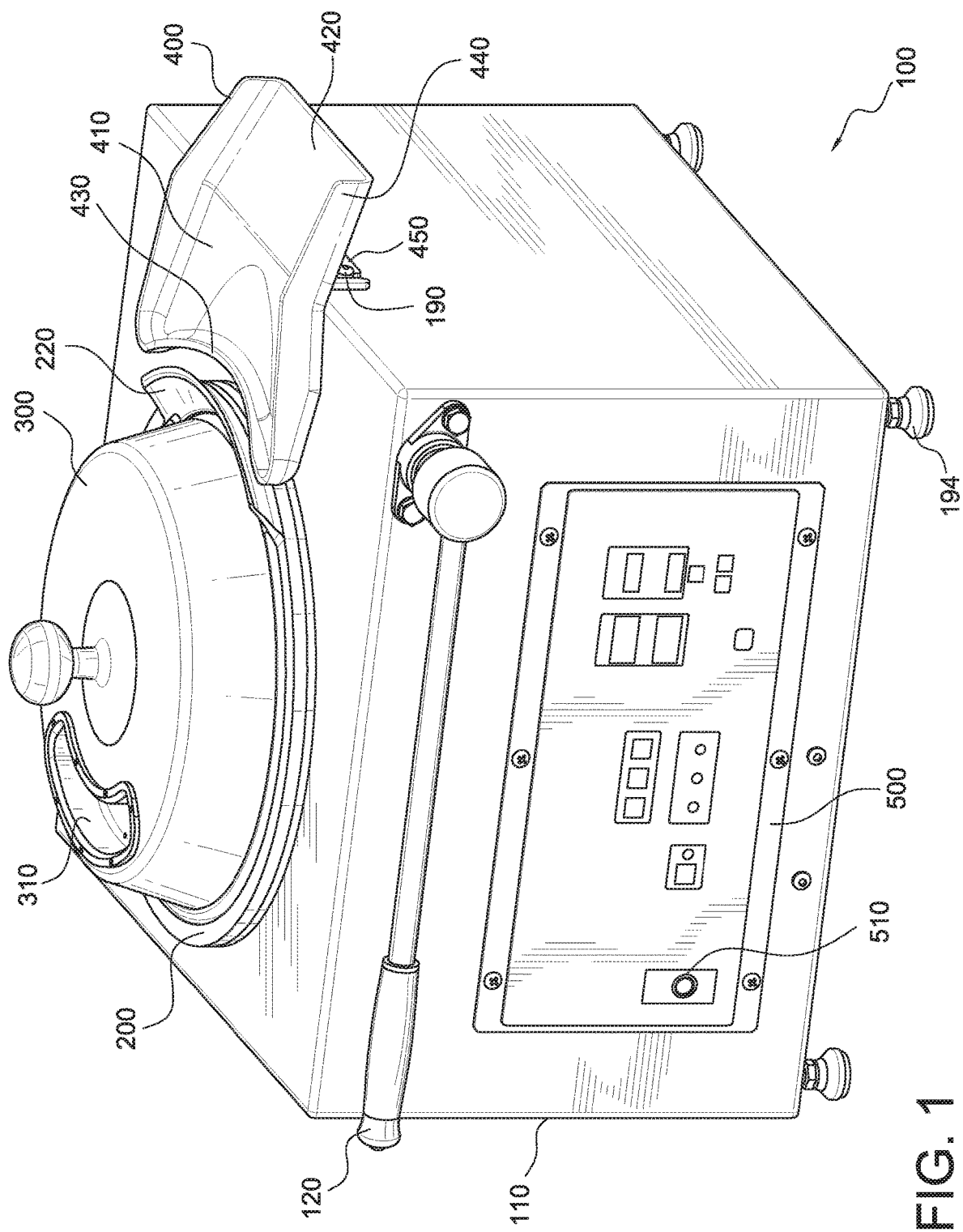
FIGS. 1, 2 and 3 are schematic illustrations of perspective, front and top views, respectively, of the roasting and glazing apparatus/assembly of the present invention.

The roasting and glazing apparatus/assembly of the present invention is able to roast and/or glaze nuts to produce roasted and sugar glazed nuts, and the description herein is provided for illustrative purposes in connection with the cooking (i.e., roasting and/or glazing) of nuts. However, the roasting and glazing apparatus/assembly of the present invention may be utilized to roast and/or glaze other food items, and it is to be understood that the invention is not limited for use with nuts. For instance, the invention may be utilized to process a variety of other types of edible items including oats, beans (e.g., coffee beans), seeds (e.g., squash, pumpkin, etc.), dried fruit (e.g., dried apricots, raisins, etc.), granola, a mixture of granola and fruit, vegetables (e.g., peas, etc.), and the like. The invention may further be employed to roast coffee beans and the like to produce products that may be used to produce liquid beverages, such as coffee, including flavored-coffee, and the like.

Moreover, as described below, the invention is discussed in the context of roasting nuts (called, for convenience, the roasting process or step), followed by the glazing of the roasted nuts (called, for convenience, the glazing process or step) to produce roasted/glazed nuts. However, the invention further entails roasting alone or glazing alone, which may be appropriate for the processing of other food items, such as one or more of those food items identified above. Accordingly, the invention is not limited to cooking that must include both roasting and glazing.

Therefore, and in view of the foregoing, use of various generic terms/phrases herein, including "roaster," "nut roaster," "nut roaster assembly," "roasting and glazing apparatus," "roasting and glazing assembly," "machine" and the like, are interchangeably used herein for convenience, and shall be understood to include devices that roast, that glaze, and that both roast and glaze nuts and other edible items, unless clearly stated otherwise. Similarly, use of the term "roaster bowl" (and other like terms) shall not provide limiting effect of such component. Names of components are provided to aid the reader in understanding what is being referenced. In addition, the term "glazed nuts" as used herein refers to sugar glazed nuts. Sugar may include other suitable coatings with which the apparatus of the present invention may be used. Moreover, the term "roasting" as used herein shall include heating, including dry heating or wet heating. The term "roasted nuts" as used herein includes nuts that are heated in the manner disclosed herein.

Still further, the figures are presented to aid in the understanding of the invention, but are not intended to limit the invention solely to precisely what is shown. For example, the illustrations show a particular appearance of the illustrative roasting and glazing apparatus/assembly (e.g., such as the rectangular shape and relative size of the roaster's housing), but it is not intended for the invention to solely have such appearance. Moreover, explanations about related functions or constructions known in the art are omitted for the sake of clarity in understanding the concept of the invention, and to avoid obscuring the invention with unnecessary detail.

As will be appreciated from the description herein, the inventive roasting and glazing apparatus/assembly includes or otherwise embodies multiple features, aspects and benefits. For convenience, these features, aspects and benefits are divided into the following groups of discussion: (A) Cover with Liquid Dispersing Design; (B) Bowl Movement: Cantilever with Pistons; (C) Steam Cleaning and Detachable Pour Tray; (D) Agitator and Bowl; (E) Smart Cleaning Cycle; (F) Front Panel Display; and (G) Additional Features. These section headings and all other headings used herein are provided for convenience and are not intended to limit the invention in any manner.

Figure 2:
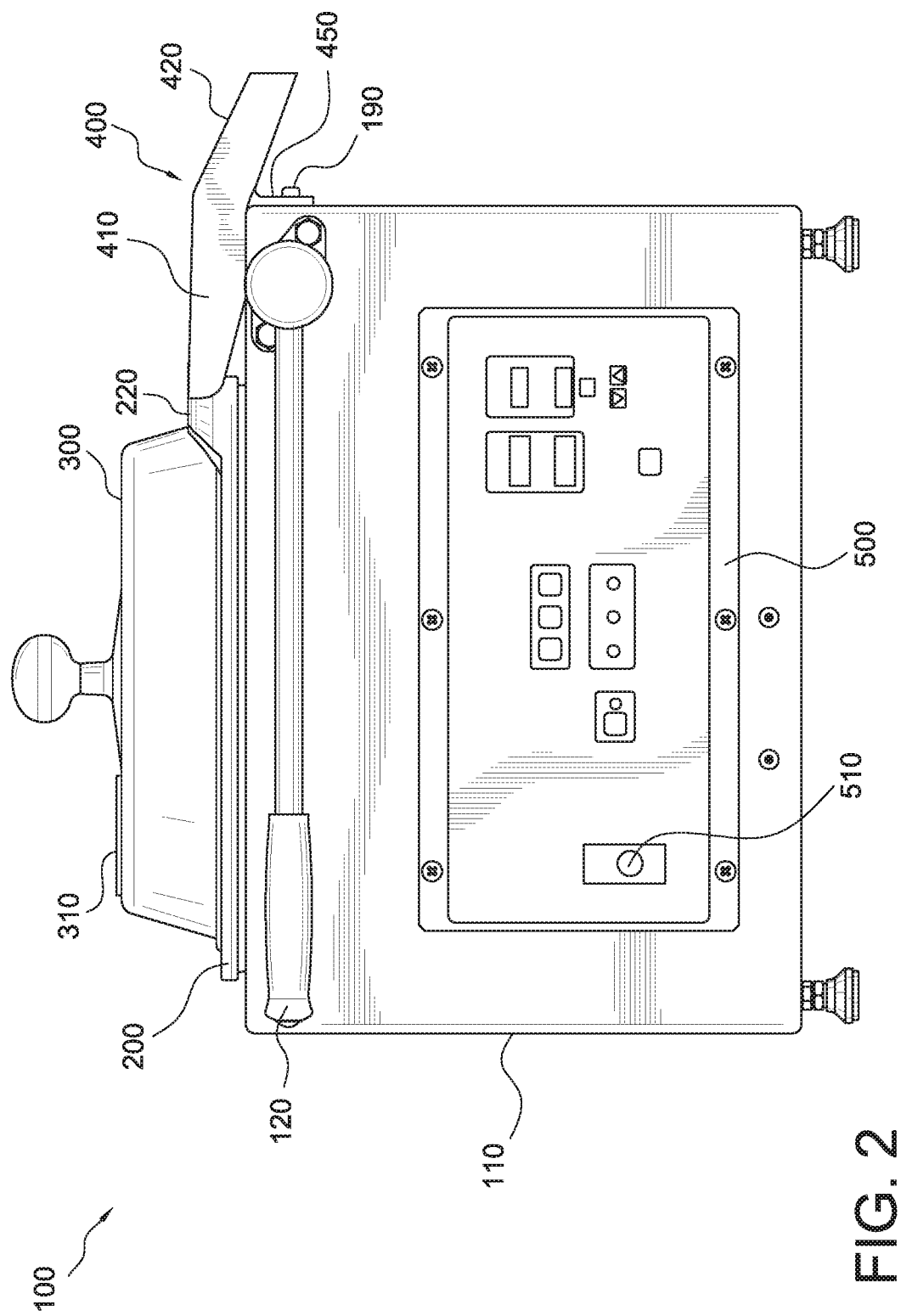
Figure 3:
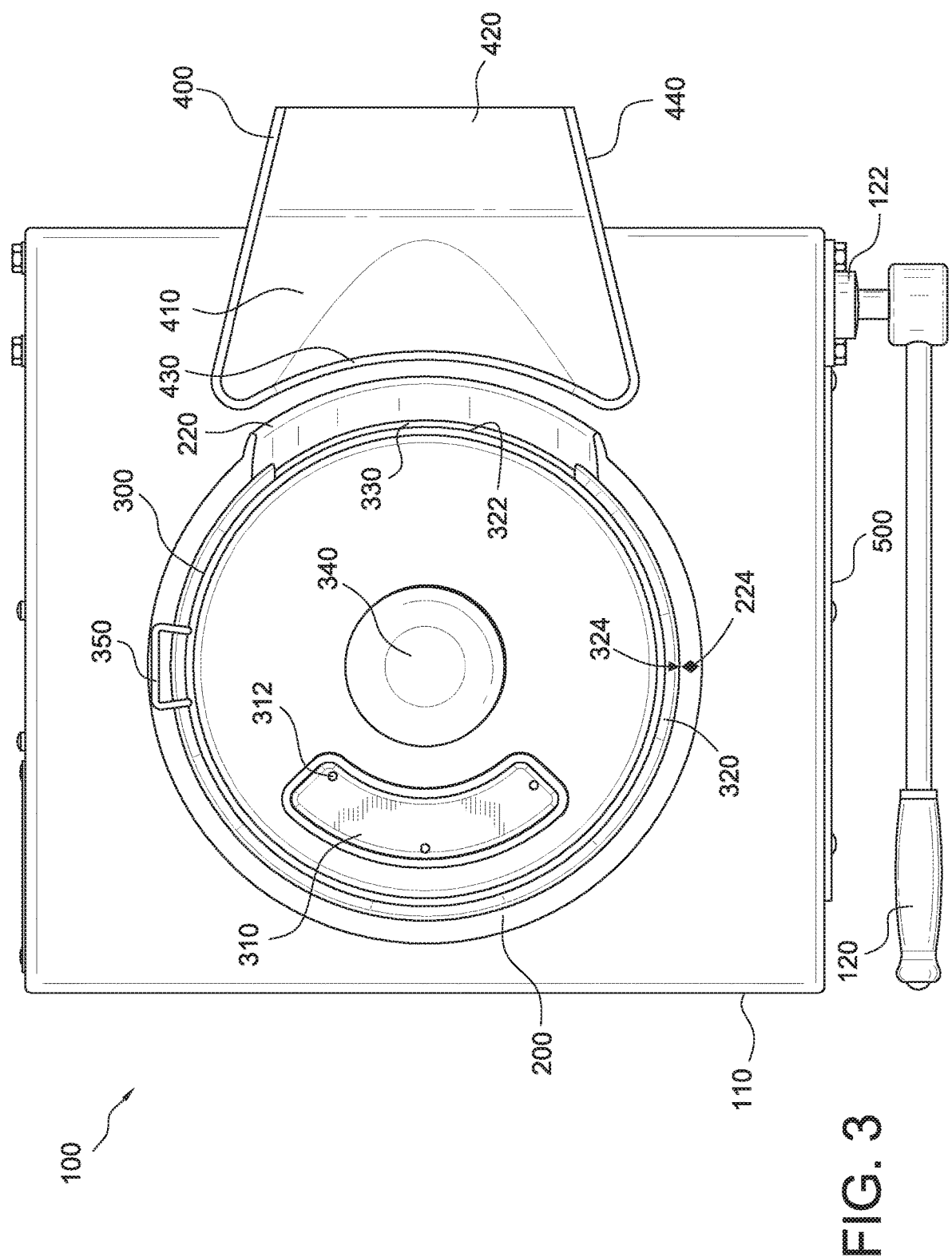

Referring now to the accompanying drawings, FIGS. 1, 2 and 3 thereof are schematic illustrations that show perspective, front and top views, respectively, of roasting and glazing apparatus/assembly 100 (for convenience, "roaster assembly 100" or "nut roaster assembly 100") in accordance with the present invention. As illustrated, nut roaster assembly 100 includes various primary components, including a housing 110, a roaster bowl 200 (only partially shown in FIGS. 1-3), a cover 300, a pour tray 400, a front panel display 500, and a cantilever arm 120. These components, associated components, and other components of nut roaster assembly 100 are described in detail below.

In providing a detailed description of the nut roaster assembly of the present invention, a basic discussion of the nut roaster's operation is set forth first, followed by a detailed discussion of the structures and functions of the above-mentioned groups.

Operation of Inventive Nut Roaster

During normal operation of the inventive nut roaster, an operator carries out various steps as described below. As would be appreciated by those of ordinary skill in the art, some of the steps may be modified, or removed altogether, as deemed appropriate by the operator.

(1) First, the operator turns a Main Power On/Off switch 510 on. Switch 510 is disposed on the inventive nut roaster's front panel 500 shown in FIGS. 1 and 2, and best represented in FIG. 5.

(2) The operator adds 8 oz. of water, or any suitable amount of water as discussed below, and a certain amount of a nut mix to the roaster bowl 200. For example, the nut mix is 2 to 2¼ lbs. of nuts, sugar and flavoring. Roaster bowl 200 with an installed agitator 230 is shown with cover 300 removed in FIG. 4A. FIG. 4B shows an exploded view of roaster bowl 200 and agitator 230. The particular structures of roaster bowl 200 and agitator 230 are discussed further below. The nut mix may be a pre-packaged commercial nut mix, or any other suitable mixture of nuts and other ingredients prepared for the purpose of roasting and glazing nuts.

If increased cooking time is desired, additional water may be added. The quantity of water may be up to 20 oz., or any suitable variation thereof. If decreased cooking time is desired, less water is added, usually with a minimum of 4 oz. of water.

Figure 5:
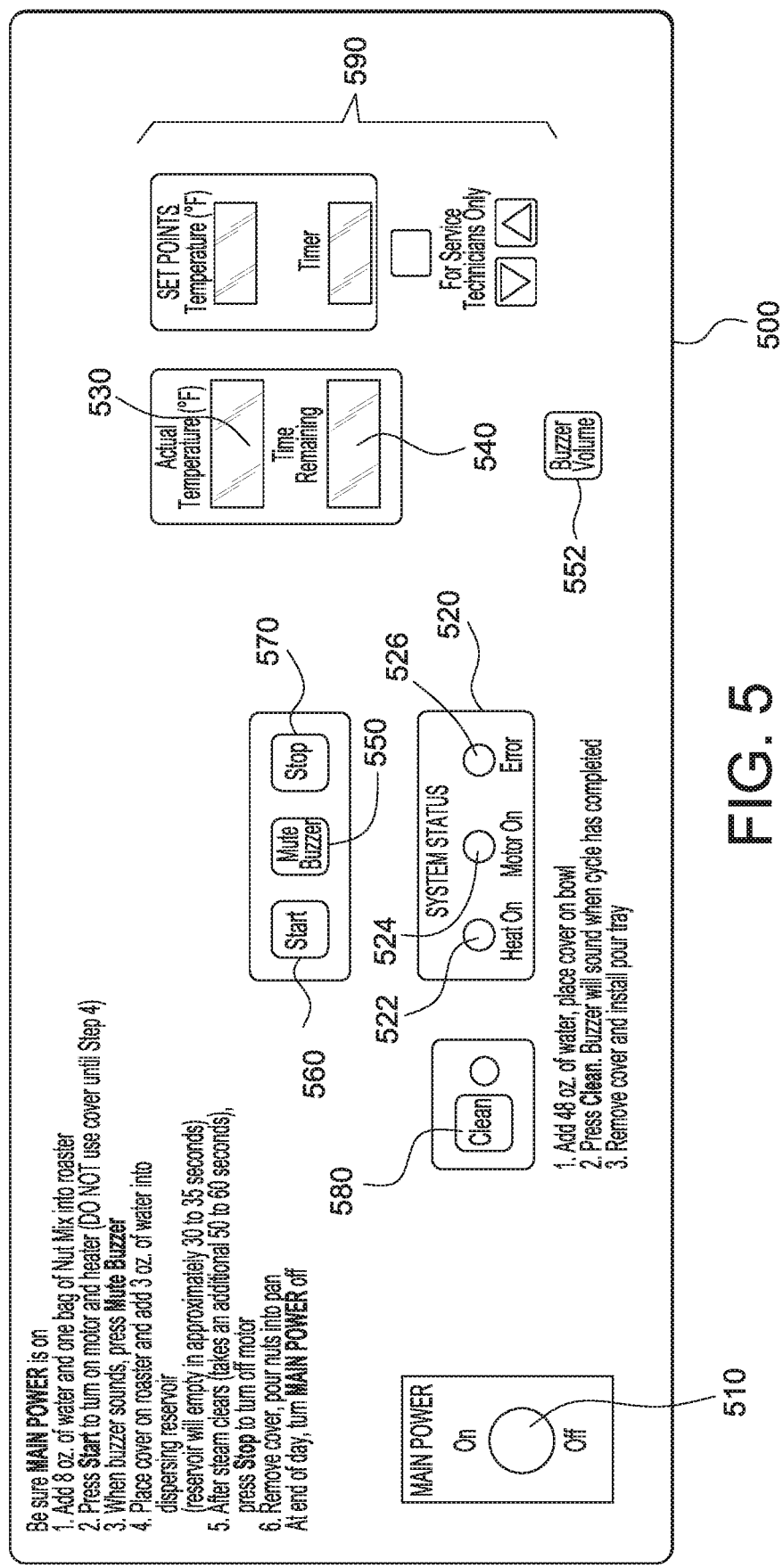
FIG. 5 is a schematic illustration of the front panel of the roasting and glazing apparatus/assembly of the present invention.
Figure 6A:
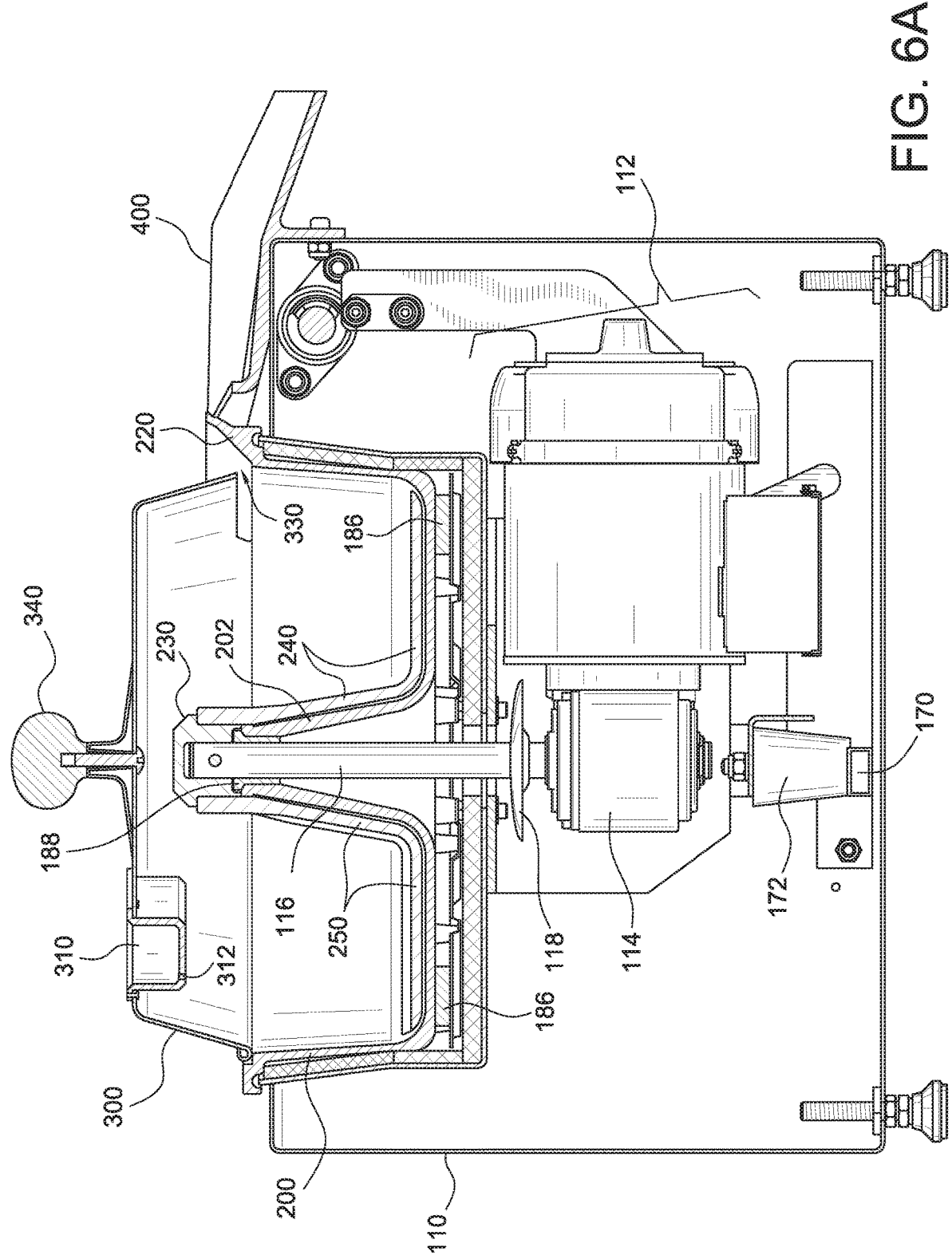

(3) The operator then depresses the Start button 560 disposed on front panel 500 shown in FIG. 5 to turn on the nut roaster's motor and heater. FIGS. 6A and 6B are front and side cross-sectional views, respectively, of nut roaster assembly 100. As shown in these figures, a motor assembly 112, including a motor therein, and heater 186 are located below roaster bowl 200.

(4) Activation of the motor causes the agitator disposed within the roaster bowl to rotate.

(5) While the agitator rotates and the roaster bowl is heated, nut roaster assembly 100 cooks the mix and roasts the nuts over a period of time. During this time, the following events occur. The water within the roaster bowl increases in temperature, which causes the sugar to turn into a brown syrup, becoming thicker and gradually adhering to the nuts. As the heater continues to heat the mixture and the agitator continues to mix the roaster bowl's contents, the water eventually boils off, which results in the sugar syrup eventually drying and turning into a white powder that adheres to the nuts. As the roaster bowl temperature continues to increase, the white powder sugar coating on the nuts turns into a dark brown liquid coating. The temperature at this point is in the vicinity of 345° F. When the roaster bowl reaches a temperature of approximately 355° F., the dark brown liquid coating on the nuts starts to turn into a whitish/brown powdery shell. The roaster bowl is further heated until it reaches a temperature of approximately 360° F. (or in the vicinity of this temperature), at which time the heater turns off and a "Time Remaining" display begins a count down to zero from 120 seconds. During this 120 second countdown, residual heat within the roaster bowl continues to dry the whitish/brown powdery shell on the nuts.

During the entire process, the temperature of the roaster bowl is shown on the "Actual Temperature" display 530 on front panel 500 shown in FIG. 5. Front panel 500 also includes the "Time Remaining" display 540, which shows the above-mentioned countdown.

Figure 7:
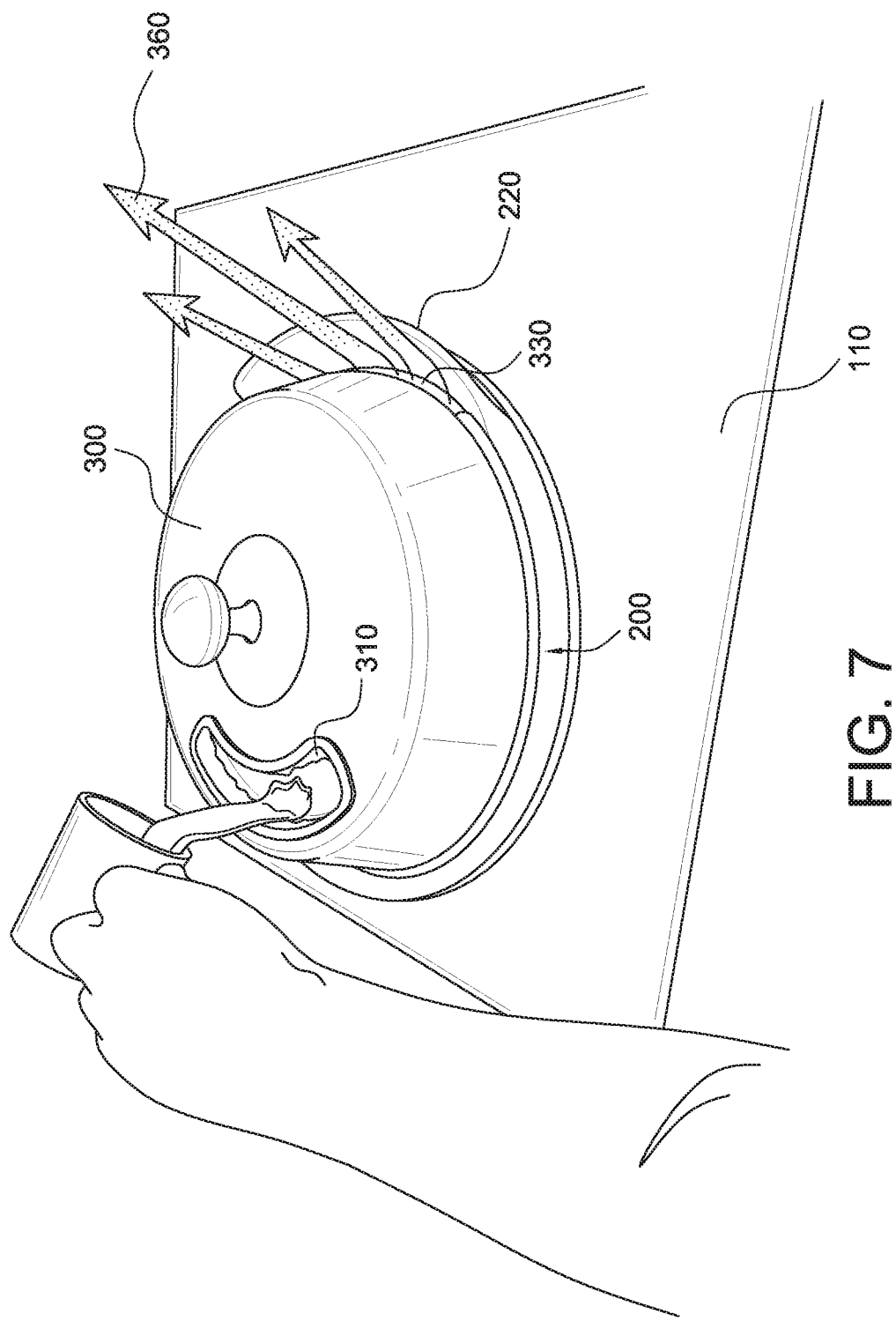
FIG. 7 is a schematic illustration of an operator adding water to the cover's water reservoir during the glazing process in accordance with the present invention.

(6) After the 120 second countdown, a buzzer within the nut roaster sounds, which prompts the operator to press the "Mute Buzzer" button (FIG. 5: button 550). The operator then places cover 300 over roaster bowl 200, and adds 3 oz. of water into a water reservoir 310 within cover 300 to create the glaze (i.e., to produce a shiny coat on the nuts). FIG. 7 schematically illustrates the operator adding water into water reservoir 310. The structure of cover 300 including water reservoir 310 are discussed in the sections that follow with reference to FIGS. 10-14.

The water added to the water reservoir slowly enters the roaster bowl through small openings (called "metering holes" herein) at the bottom of the reservoir. The water that enters the roaster bowl is turned into steam, which escapes through the cover's steam vent 330. The escaping steam is schematically shown as arrows 360 in FIG. 7 (also see FIG. 11, which better shows steam vent 330). This process/step of adding water into water reservoir 310 (which ultimately causes steam to escape through steam vent 330) is referred to herein, for convenience, as the glazing step.

(7) After the steam clears, which takes about 50 to 60 seconds after the water is fully dispensed within the roaster bowl, the operator presses the "Stop" button 570 on the front panel 500 (FIG. 5), which causes the agitator within the roaster bowl to stop turning and the heater to turn off. The operator then removes cover 300.

Figure 8:
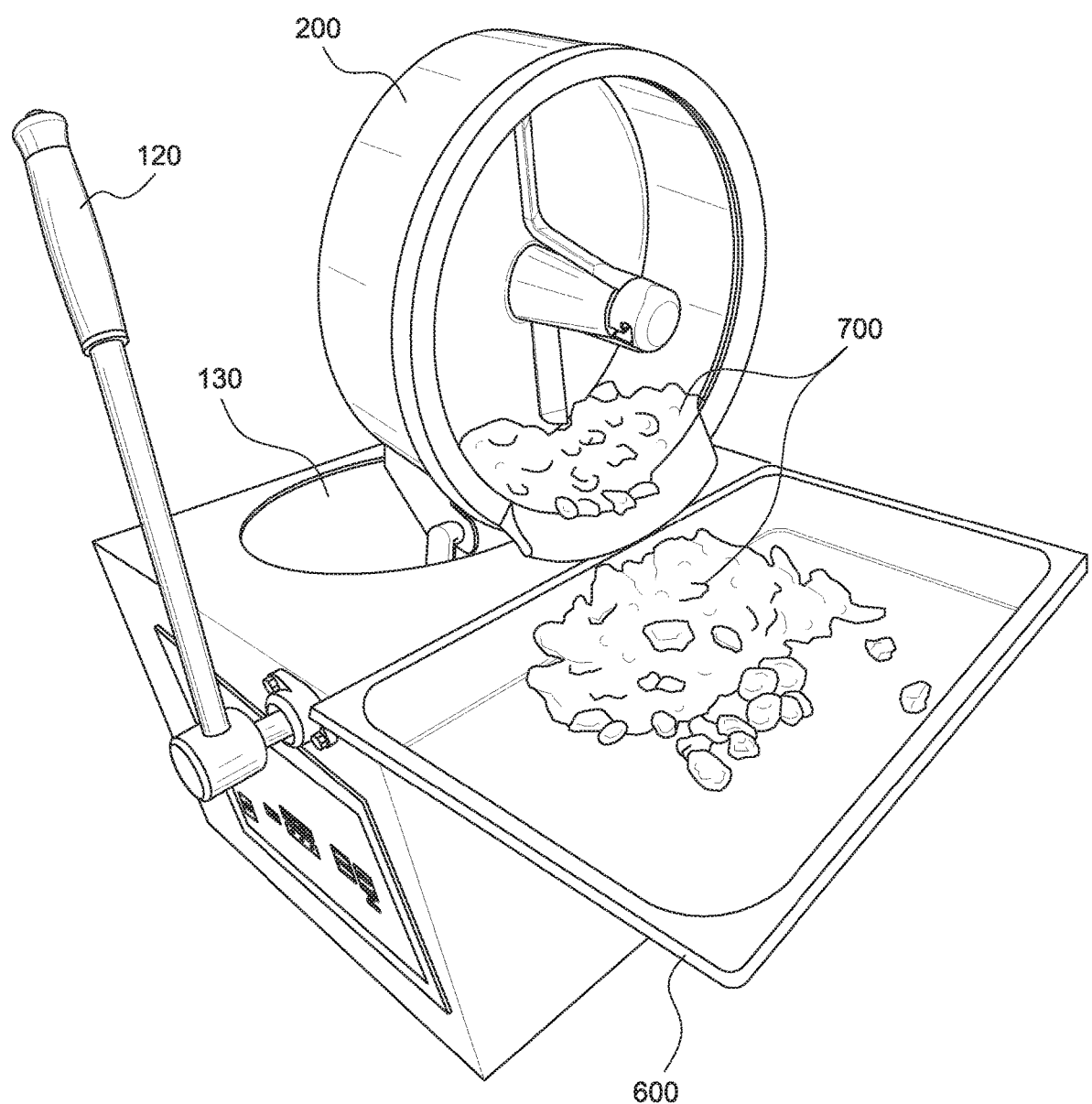
FIG. 8 is a schematic illustration that shows the roaster bowl at its highest position while emptying a batch of roasted/glazed nuts in accordance with the present invention.

(8) The operator lifts cantilever arm 120 to tilt roaster bowl 200 to its highest position, which is schematically illustrated in FIG. 8. In this position, most if not all of the roasted/glazed nuts 700 are emptied into a cooling pan 600.

(9) The operator may use tongs or other appropriate tool to assist in removing all of the roasted/glazed nuts from roaster bowl 200. Preferably, the operator separates and spreads the nuts evenly in cooling pan 600. The nuts should be allowed to cool (e.g., for at least 20 minutes) to allow the nuts' sugar coating to fully harden/dry before the roasted/glazed nuts are packaged within individual-sized paper cones, cups or other containers, or packaged within a larger container or bag.

The present invention also entails a novel cleaning process, which is described below. During production of the roasted/glazed nuts, sugar from the mix may coat the inside of roaster bowl 200 and/or the agitator within the roaster bowl. If too much sugar builds up, the nut roaster assembly should be cleaned. Generally, the nut roaster assembly should be cleaned after a certain number of batches of roasted/glazed nuts are made (e.g., 10 batches) in order to minimize the amount of sugar build-up within the roaster bowl. If too much sugar remains within the roaster bowl during the herein-described cooking process, a burnt aroma or taste to the roasted/glazed nuts may result.

Finally, upon completion of all production, such as at the end of a day and/or after cleaning the nut roaster assembly, the operator turns Main Power On/Off switch 510 off to turn off the nut roaster.

As mentioned above, front panel 500 includes Main Power On/Off switch 510. Front panel 500 also includes other components, including a System Status display 520 and service technician control buttons. Front panel 500 also includes a "Clean" button 580 (FIG. 5) that initiates a cleaning cycle/process in accordance with the present invention.

Nut Roaster Cleaning Process

There are three versions of the cleaning cycle/process of the present invention. In accordance with a first version, the clean cycle is programmed to extend for a predetermined amount of time. In a second version, the length of the clean cycle is manually selected by the operator. In a third version, a so-called Smart Cleaning cycle is performed. The first and second versions of the cleaning cycle are described as follows. The third version, that is, the Smart Cleaning cycle, is discussed in section (E) below.

To clean the nut roaster assembly, in accordance with the first version of cleaning cycle, the following steps are performed.

(1) The operator pours 48 oz. of water into roaster bowl 200, places cover 300 over the roaster bowl, and presses Clean button 580 on the front panel 500 to initiate the clean cycle. The clean cycle is pre-programmed to last for 5 minutes, during which nut roaster assembly 100 heats roaster bowl 200 until the water begins to boil.

(2) The water continues to boil for the remainder of the clean cycle. As the water is boiling, steam is created that dissolves sugar that is stuck-on (i.e., adhered to) roaster bowl 200, agitator 230, and the underside of cover 300. This step, called herein for convenience the steam-cleaning step/phase, is discussed in greater detail within the sections that follow.

Optionally, the clean cycle can be pre-programmed to last longer or shorter than 5 minutes (e.g., 3 minutes, 4 minutes, 6 minutes, 7 minutes), if desired. Operator monitoring is not required during the 5-minute clean cycle (or other amount of time, if programmed) since the nut roaster's heater automatically turns off when the clean cycle is complete.

Rather than being pre-programmed, the amount of time of the clean cycle can be manually selected by the operator (i.e., the second version). In such version, the operator designates the number of minutes of the clean cycle. In the third version, the Smart Cleaning cycle is employed, which is discussed in section (E) below.

Figure 9:
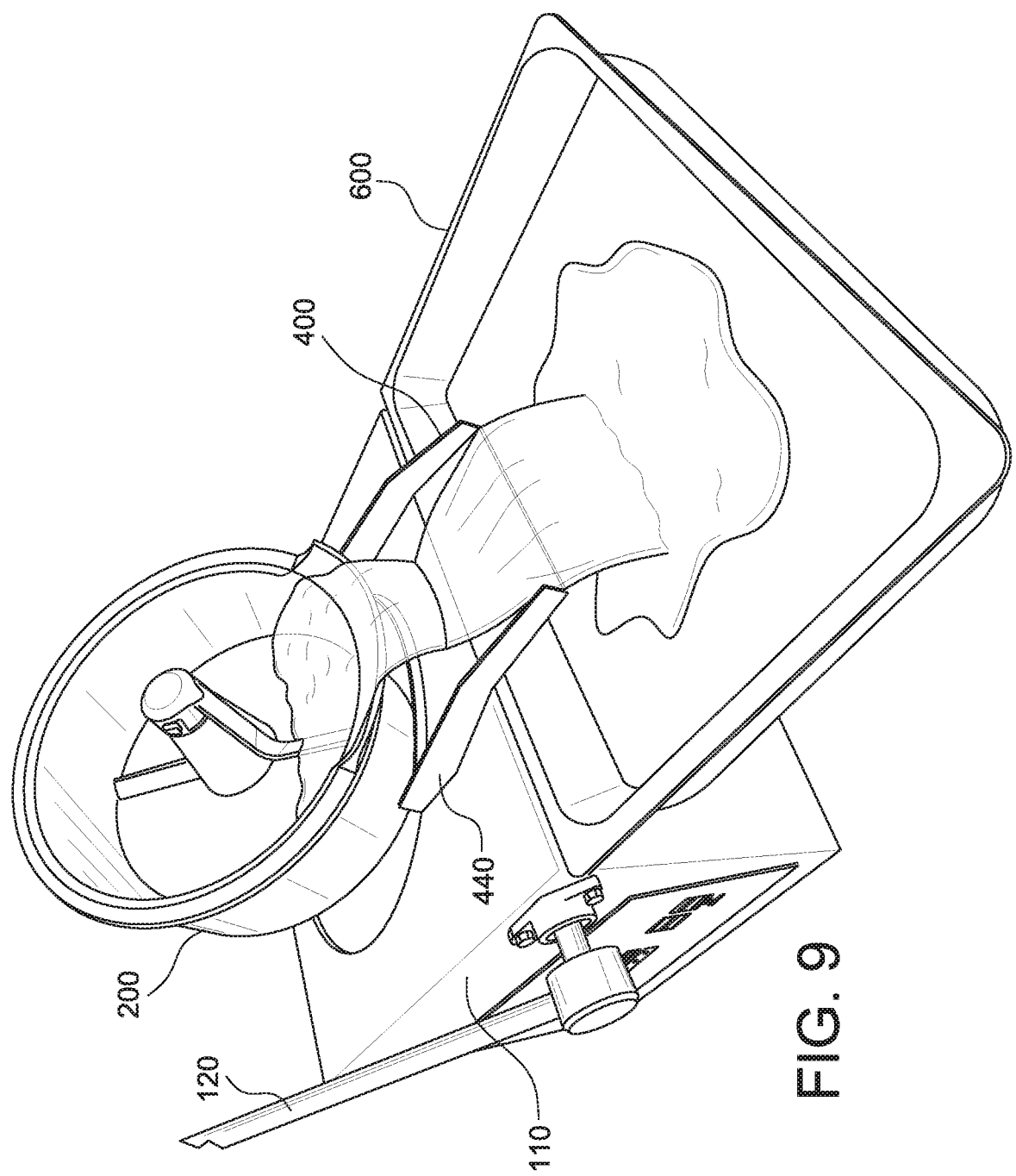
FIG. 9 is a schematic illustration that shows water being emptied from the roaster bowl after a cleaning process in accordance with the present invention.

(3) Upon completion of the clean cycle (of any of the clean cycle versions), the operator removes cover 300, installs pour tray 400 onto the roaster housing 110 (details of the pour tray further discussed below), provides a suitable pan, tray, bucket or other suitable device (e.g., pan 600) under the edge of pour tray 400, and slowly lifts cantilever arm 120 to raise roaster bowl 200, such as shown in FIG. 9. As roaster bowl 200 is raised, the water within the roaster bowl pours onto pour tray 400 that directs the water into pan 600. The operator lifts cantilever arm 120 gradually to its highest position to cause all of the water to vacate from roaster bowl 200.

(4) The operator then, preferably using a heat safe glove, removes the very hot agitator from within roaster bowl 200, and proceeds to clean any remaining residue from the agitator, cover 300, and pour tray 400 in a sink.

(5) The operator cleans off any remaining residue in roaster bowl 200 using damp paper towels or a clean sponge, or any other suitable cleaning tools.

(6) The operator may further clean the outside of the nut roaster assembly 100 using a wet rag or small utility brush, or any other suitable cleaning tools.

After nut roaster assembly 100 is run through a cleaning cycle, further batches of roasted nuts may be made. If no further batches are needed, the operator turns off nut roaster assembly 100 by switching Main Power On/Off switch 510 to the Off position.

Structures/Functions of Inventive Roasting and Glazing Apparatus

Having described the basic operation of the nut roaster assembly 100 of the present invention, including a discussion of the cleaning process, a detailed discussion of each of the above-identified groups of features, aspects and benefits are set out as follows.

(A) Cover with Liquid Dispersing Design

Cover 300 of nut roaster assembly 100 is structured to be placed over roaster bowl 200, such as shown in FIGS. 1-3 and 7.

Figure 10:
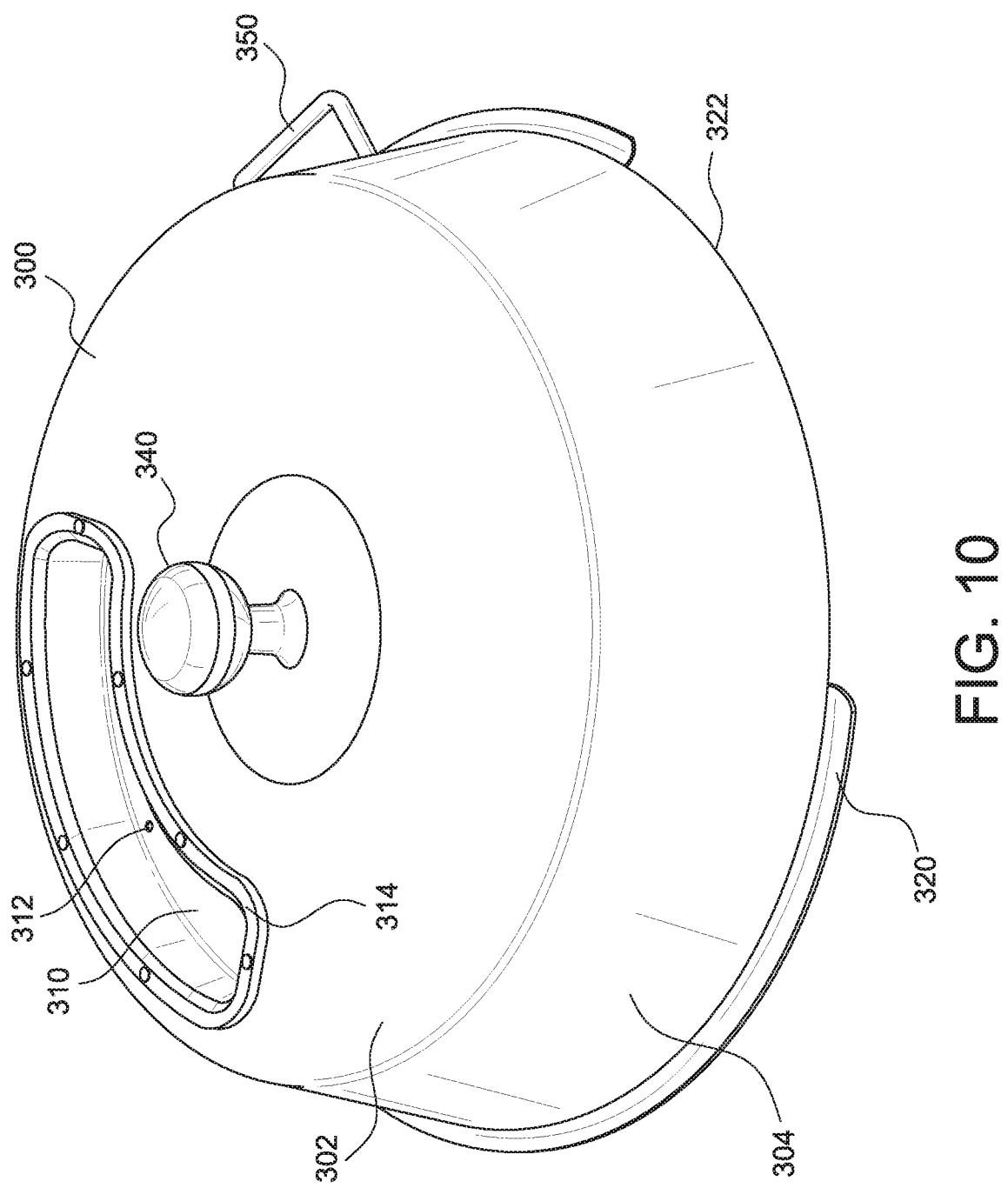
FIG. 10 is a schematic illustration of the inventive cover of the roasting and glazing apparatus/assembly of the present invention.

FIG. 10 schematically shows cover 300 without the other components of the nut roaster assembly. As shown, cover 300 includes water reservoir 310 recessed within the cover's top surface 302. Cover 300 also includes a top handle 340 extending from the cover's top surface 302, a side handle 350 coupled to the handle's side surface 304, and a rolled edge 320 that extends partially around the bottom of side surface 304. Side handle 350 can be used to hang the cover for storage on a peg or hanger extending from a wall, cabinet or other object.

Figure 11:
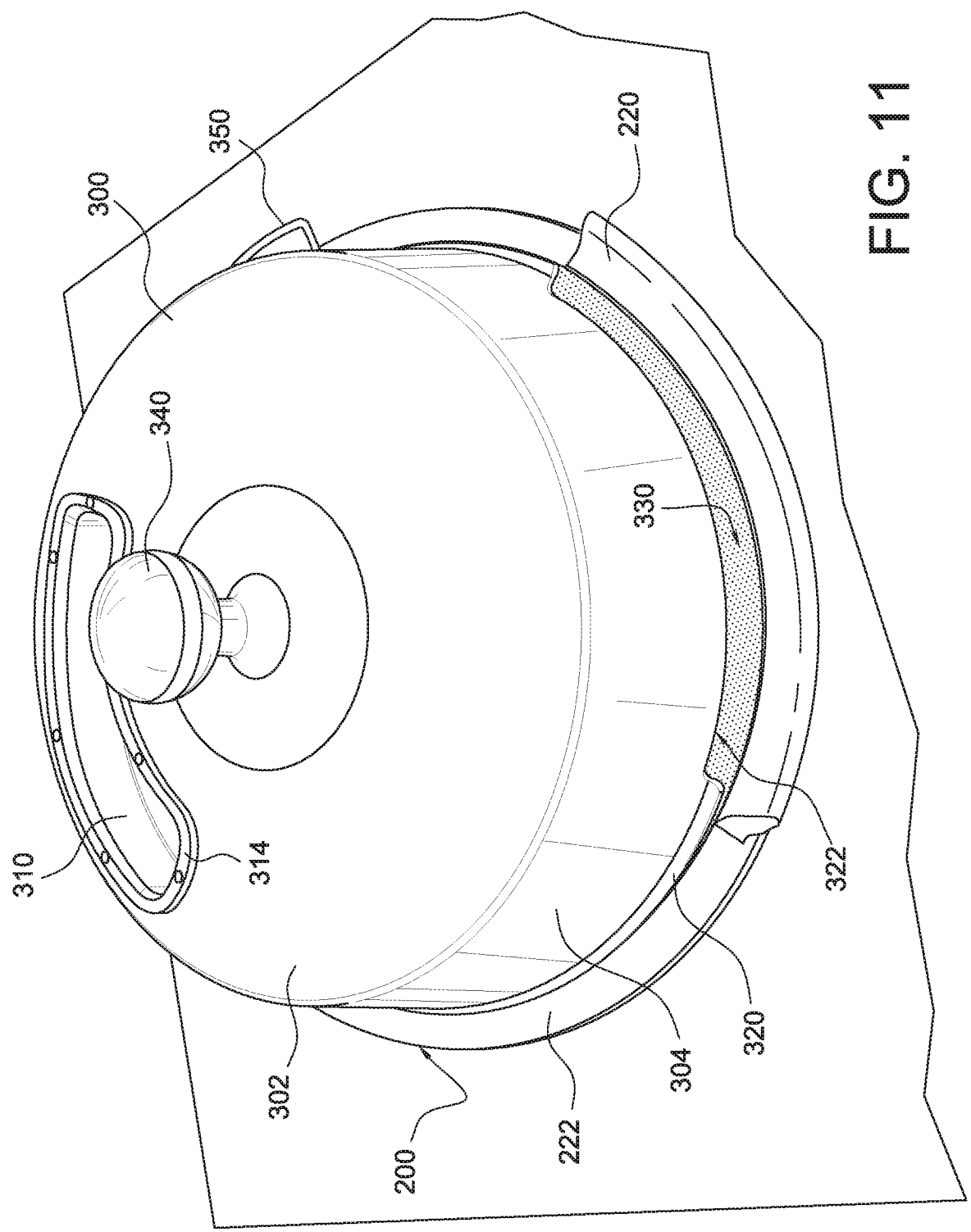
FIG. 11 is a schematic illustration showing the cover of FIG. 10 placed on the roaster bowl of the roasting and glazing apparatus/assembly of the present invention.

FIG. 11 shows cover 300 disposed on roaster bowl 200 (with only the top portion of the roaster bowl shown). As illustrated in FIGS. 10 and 11, the cover's side surface 304 flares outwardly from its upper edge to its lower edge.

The Cover's Water Reservoir

Figure 12:
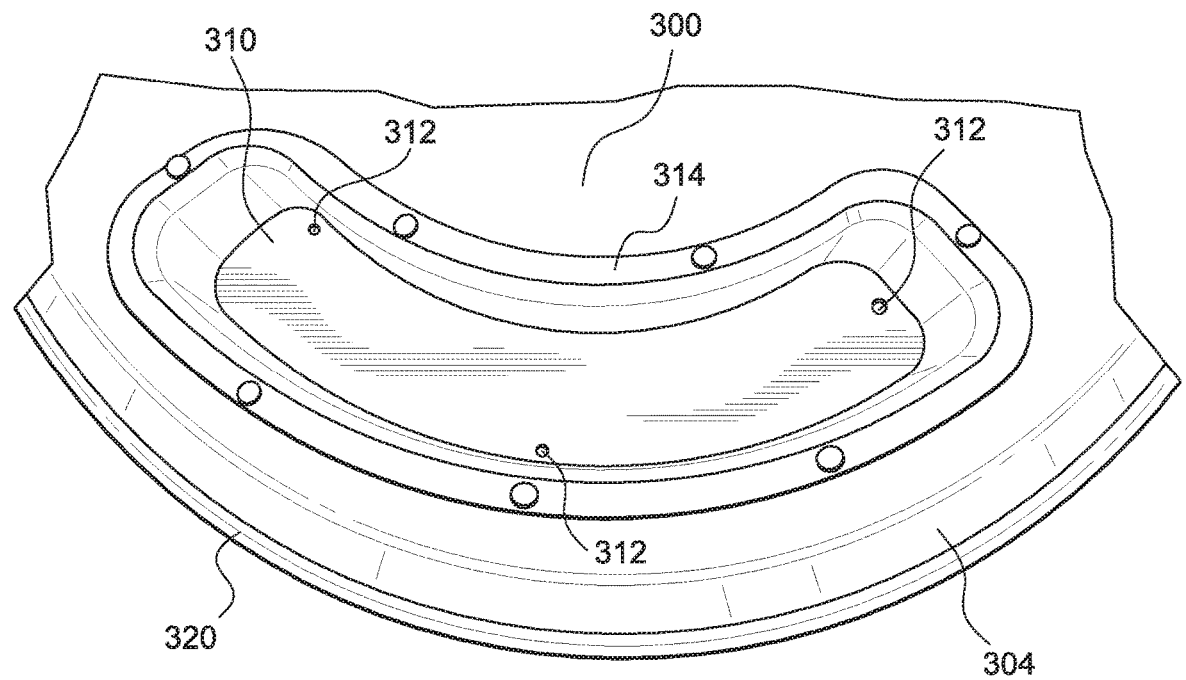
FIGS. 12 and 13 are enlarged, perspective top and bottom views, respectively, of the nut roaster cover, particularly showing the cover's water reservoir of the present invention.
Figure 13:
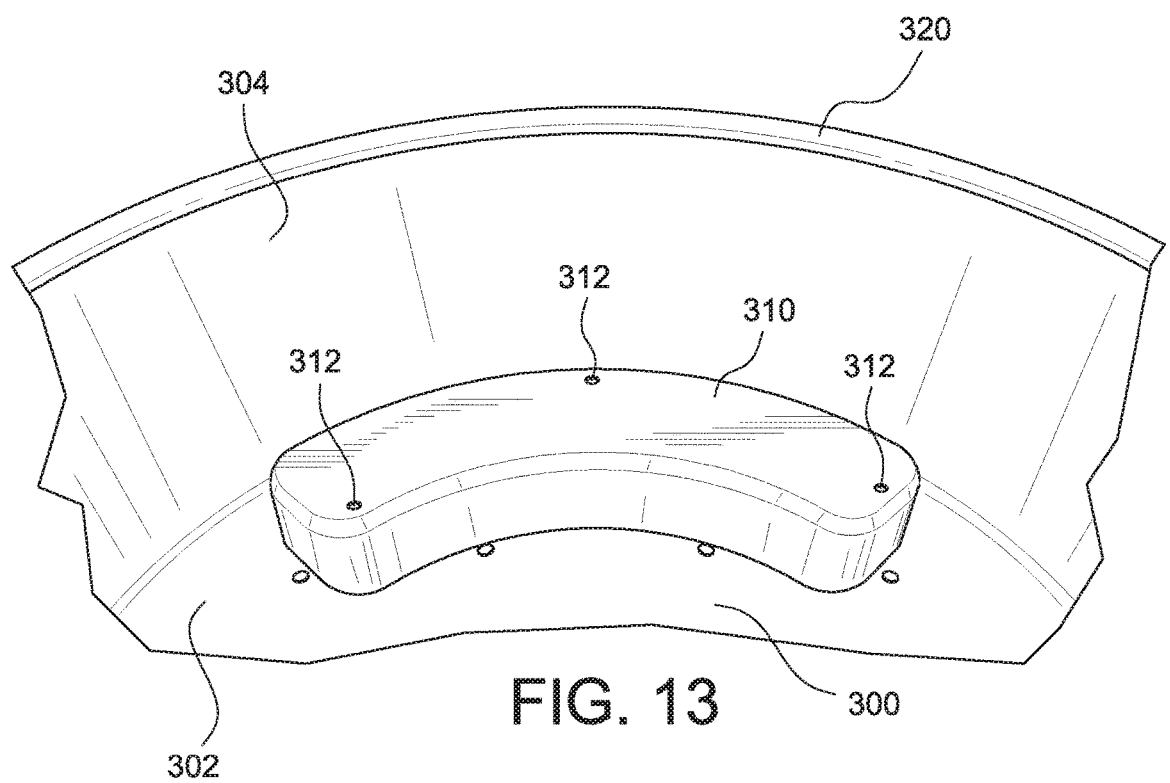

The cover's water reservoir 310, shown best in the top view of FIG. 3 and the enlarged view of FIG. 12, includes metering holes 312 within the reservoir's bottom surface. As discussed above, water is added to the reservoir during the glazing step of the cooking process. Metering holes 312 allow the water to flow into roaster bowl 200 during this step.

Metering holes 312 disperse the water within the roaster bowl at a set interval of time. That is, metering holes 312 are precisely sized to disperse the water into the roaster bowl in a gradual and controlled manner. For example, metering holes 312 may disperse the water over a period of 10 to 15 seconds (i.e., a flow rate of 3 ounces over 10 to 15 seconds, or the proportional equivalent flow rate for a different amount of water). The flow rate may be greater or slower (e.g., a flow rate of 3 ounces over more than 15 seconds, a flow rate of 3 ounces over at least 30 seconds, etc.). In a preferred version, the flow rate disperses 3 ounces of water over a period of between 30 and 35 seconds. Water is dispersed within the nut roaster over multiple revolutions of the agitator while it is turning, thus allowing the water to be dispersed over the nuts more evenly which, in turn, results in better coated glazed nuts.

Moreover, by producing steam over such relatively long period of time, less steam is instantaneously produced at any given instant of time as compared to the amount of steam instantly produced by the addition of 3 oz. of water from a measuring cup directly into the roaster bowl (i.e., without the use of the herein-described inventive cover). Cover 300, with water reservoir 310, therefore prevents or otherwise minimizes the risk of scalding the operator by any steam that is produced after water is added to the water reservoir. That is, after the cooking cycle, the roaster bowl is typically at a temperature of over 360° F. When water, which may be cold water, is added to the roaster bowl at this temperature, a burst of steam is produced. However, due to the structure/components of cover 300, the size of each burst of steam that is produced at any given instant is minimized.

In addition, as further discussed below, steam that is produced is directed away from the operator so that scalding of an operator's hand or arm is avoided.

The metering holes 312 within water reservoir 310 may have the same shape and size, or have different shapes and sizes. Moreover, the location of each metering hole 312 within the reservoir may be different than that shown in the figures. For instance, in FIG. 12, three metering holes are provided: two of the holes disposed on opposite ends of the reservoir, with the third in the center (near a side edge). The metering holes 312 are also shown in the enlarged, bottom view of FIG. 13, which illustrates a portion of the underside of cover 300. However, the metering holes may be located elsewhere within the water reservoir. Moreover, while three metering holes are shown in the various figures, the water reservoir may have a different number of metering holes, such as one, two, four or more.

FIGS. 3 and 12 (and other figures) schematically illustrate the location and shape of water reservoir 310. The location and shape of the water reservoir provide additional benefits discussed below. Water reservoir 310 is sufficiently deep, such as shown in FIGS. 6A and 7, to accommodate all of the water (e.g., 3 oz. of water) that is needed to glaze the nuts. However, the shape, size and depth of water reservoir 310 may be different than that described herein and shown in the drawings, as would be appreciated by those of ordinary skill in the art.

Water reservoir 310 may be a separate component that is disposed within an aperture of the cover and secured thereto by any suitable means (e.g., welded, bolted, etc.). In the version shown in the drawings, water reservoir is a separate component and includes a raised edge 314 that is disposed above the cover's top surface 302 (see FIGS. 10 and 11). In a variation, water reservoir 310 is integral with cover 300 (i.e., made from the same piece of material).

The Cover's Rolled Edge and the Steam Vent

Figure 14:
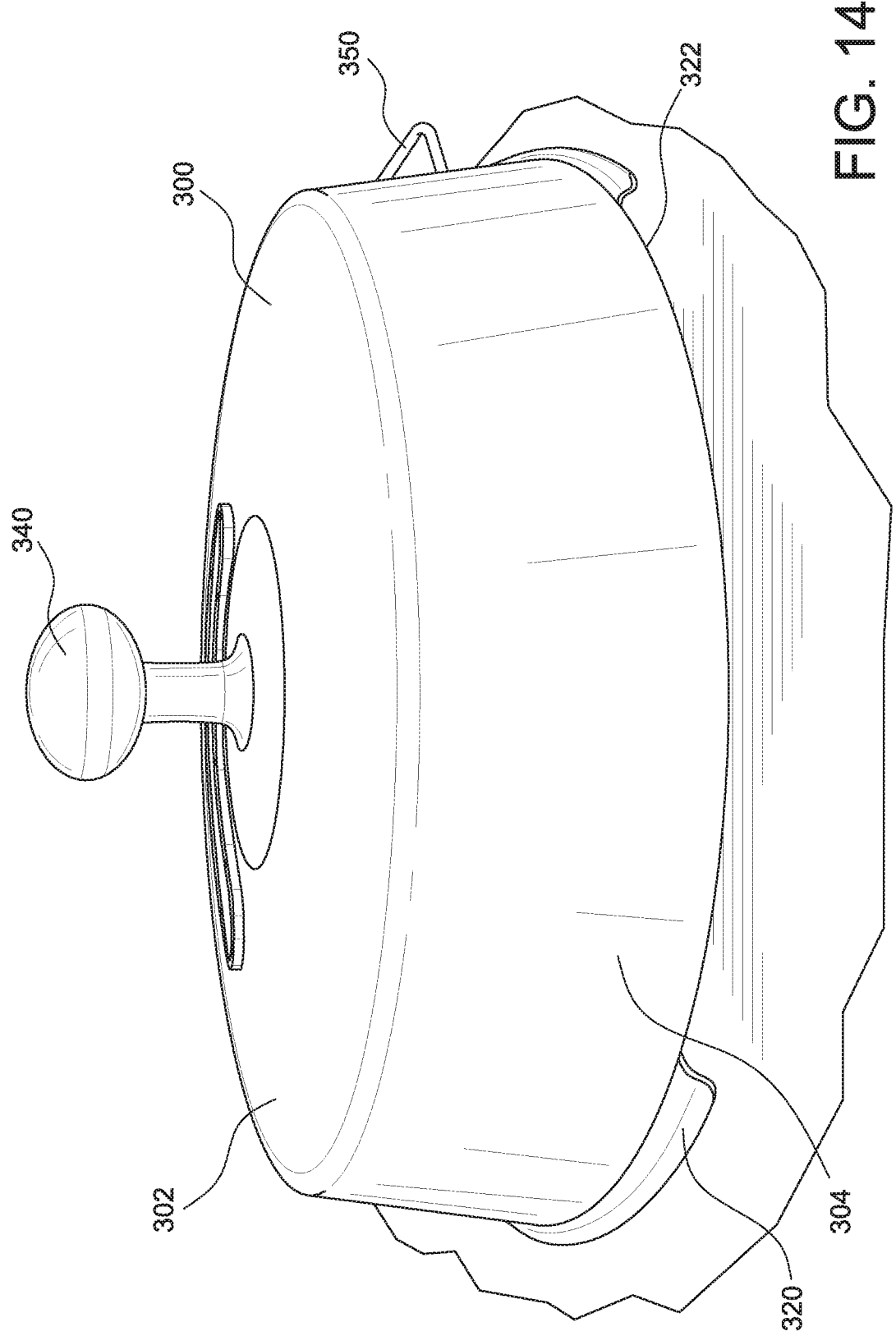
FIG. 14 is another schematic illustration of the nut roaster cover of the present invention.

As illustrated in FIGS. 10, 11 and 14, the cover's side surface 304 includes a rolled edge 320 that extends partially, but not fully, around the cover's bottom perimeter. As shown, a non-rolled edge 322 of the bottom of side surface 304 represents that portion of the cover that does not include rolled edge 320. That is, rolled edge 320 extends roughly 80% around the cover's perimeter, with non-rolled edge 322 representing the remaining 20%. It is noted that the rolled edge may have a different length, such as extending 70%, 75%, or 85% around the cover's perimeter, or another appropriate length.

Rolled edge 320 is shown thicker than the cover's side surface 304, and generally is rounded, but the rolled edge may have a different shape, thickness and size than that shown in the figures. The term "rolled edge" is used herein for convenience to represent an edge shape that is different from the shape of the non-rolled edge. Hence, rolled edge 320 may have a shape that does not appear to be "rolled."

Rolled edge 320 serves to form a seal between cover 300 and roaster bowl 200 when the cover is placed on top of the roaster bowl. As perhaps best shown in FIG. 4A, roaster bowl 200 includes a groove or channel 210 (also called herein "bowl channel") that extends partially around the perimeter of the top of the roaster bowl and is shaped to receive the cover's rolled edge 320 when the cover is placed on top of the roaster bowl. Bowl channel 210 does not extend fully around the roaster bowl and thus is "keyed" so that cover 300 is correctly positioned (i.e., correctly placed and angularly aligned) when the entire rolled edge 320 of the cover is within the bowl channel.

To further facilitate proper alignment of cover 300 on roaster bowl 200 by the operator, the cover and roaster bowl include alignment markings 224, 324, as shown in FIG. 3. Roaster bowl 200 includes alignment mark 224, which is in the shaped of a diamond. Cover 300 includes, on its rolled edge 320, alignment mark 324, which is in the shaped of an arrow (or triangle). Accordingly, the operator places cover 300 on bowl 200 at the orientation at which the two alignments marks are adjacent to one another.

The rolled edge may be a component separate from cover 300, that is, not be an integral part of cover 300. For instance, the rolled edge may be a gasket or other suitable sealing device. Such component may be glued or otherwise permanently fixed to the bottom of cover 300, or may be separable from cover 300. In yet another variation, a sealing component, such as a gasket, may be fixed to the top of roaster bowl 200, thereby providing a seal between roaster bowl 200 and cover 300 when mounted thereon.

Figure 4A:
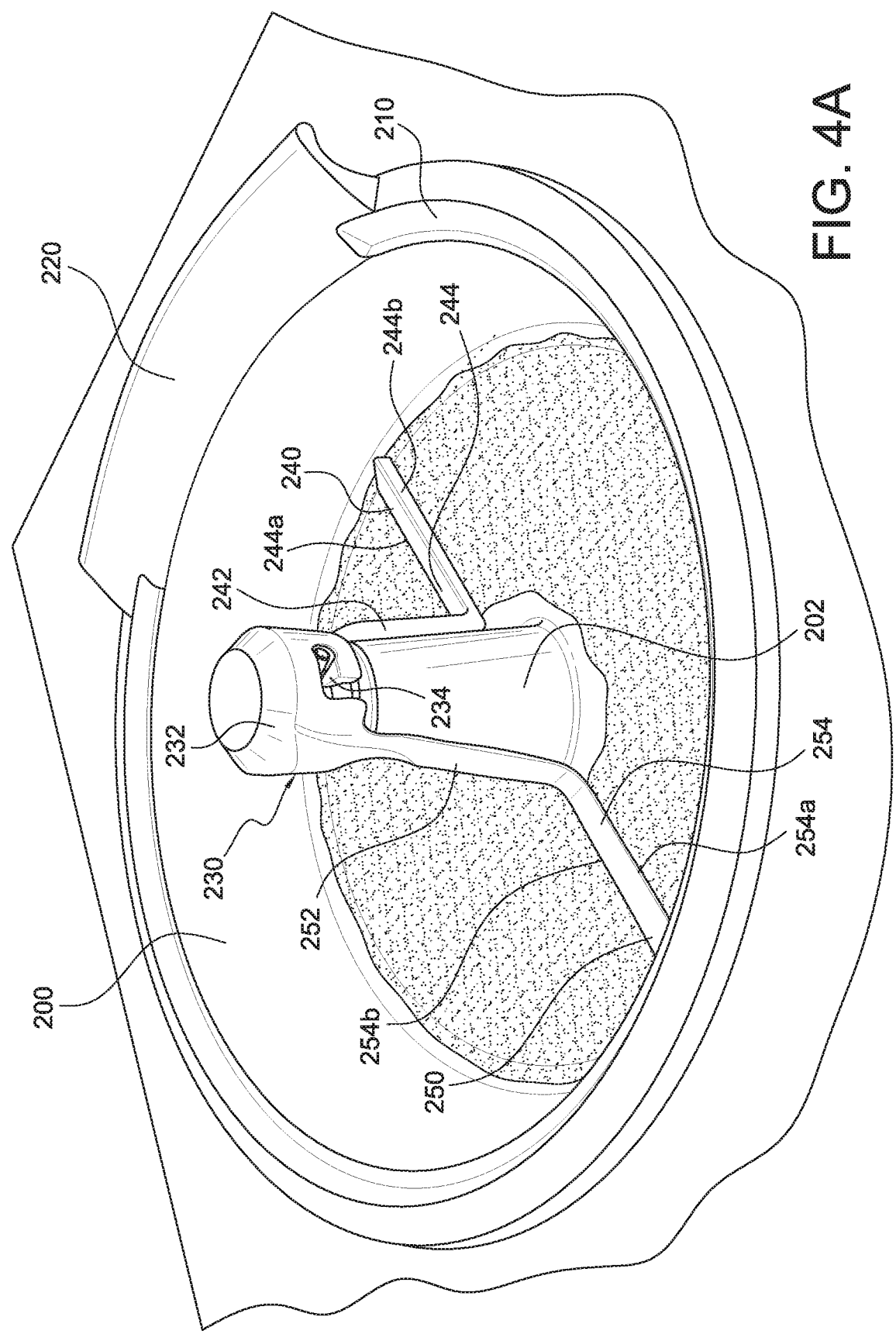
FIG. 4A is a schematic illustration of the roaster bowl with the agitator in accordance with the present invention.
Figure 4B:
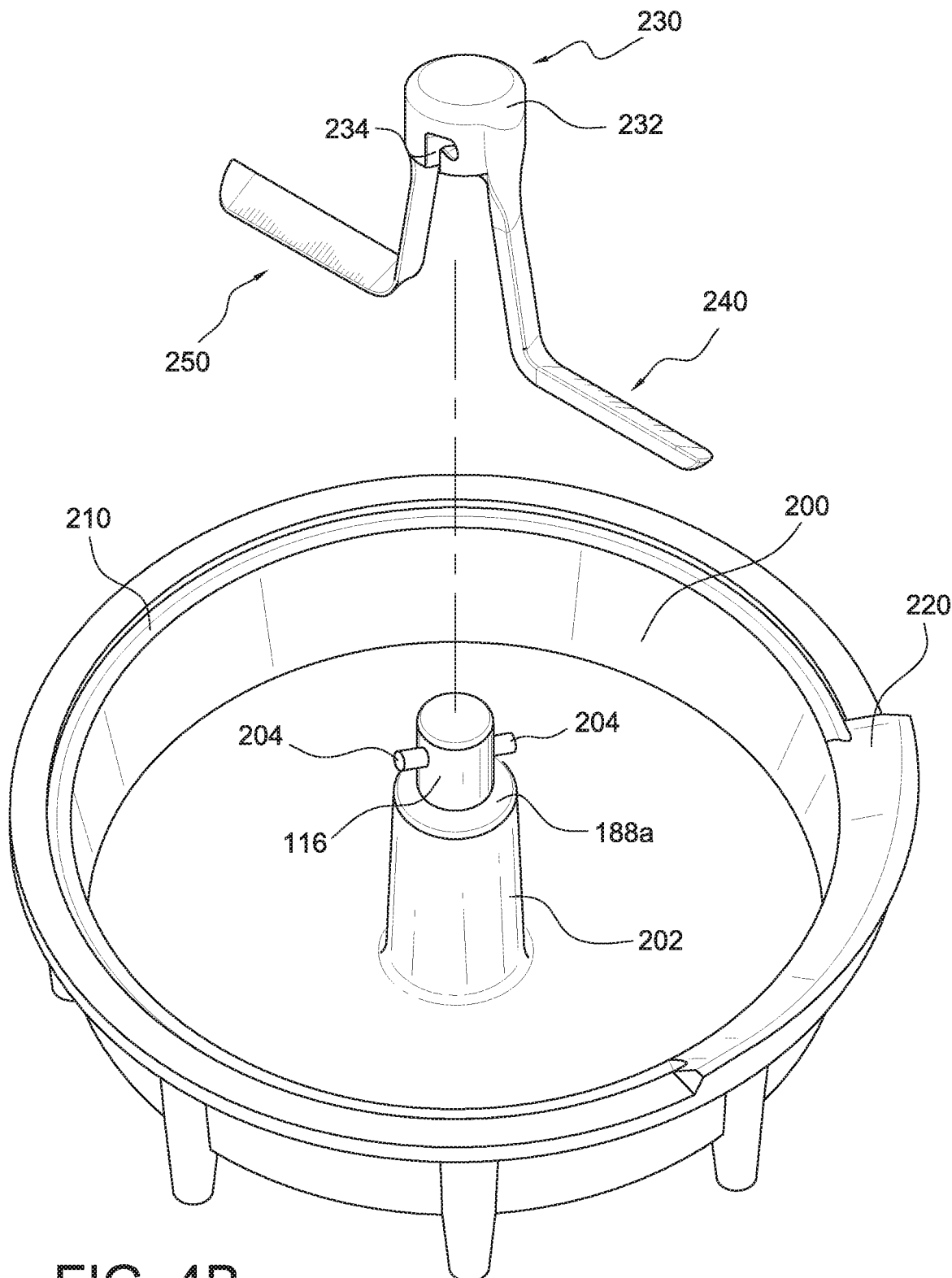
FIG. 4B is a schematic illustration of an exploded view of the roaster bowl and the agitator of the present invention.

Roaster bowl 200 includes a pouring lip 220 as shown in FIG. 4A (also shown in other figures including FIGS. 1 and 11). Pouring lip 220 extends around the perimeter of roaster bowl 200 where bowl channel 210 does not extend, although the pouring lip and bowl channel overlap slightly at their respective ends, as illustrated in FIG. 4A.

As illustrated in FIGS. 3 and 11, when cover 300 is placed on roaster bowl 200, with the cover's rolled edge 320 properly disposed within the bowl channel, non-rolled edge 322 of the cover is positioned immediately above the bowl's pouring lip 220. Then, without a rolled edge 320 extending from the cover's side surface 304 in the vicinity immediately above the bowl's pouring lip 220, an opening 330 is formed at such location. Opening 330 is referred to herein as steam vent 330 since it serves as a vent for steam created during the herein-described glazing step. As illustrated in FIG. 7, steam (represented by arrows 360) escapes from within the roaster bowl 200 through steam vent 330.

Still referring to FIG. 7, when cover 300 is placed on roaster bowl 200 as shown in the figure, water reservoir 310 and steam vent 330 are disposed on diametrically opposite sides of the cover. Accordingly, when steam is produced during the herein-described glazing step (i.e., when water is added to water reservoir 310), the steam is gradually produced as a result of the measured dispensing of water via water reservoir 310 and such gradually produced steam escapes from within the roaster bowl only through (or at least mostly only through) steam vent 330. Hence, steam escapes at a position of the cover that is disposed on the opposite side of the water reservoir, thus preventing scalding of the operator's hand and arm while filling the water reservoir.

As mentioned above and shown in the various figures, cover 300 includes a top handle 340. Top handle 340 is made of heat-resistant plastic (or other suitable heat-resistant material) and is used to lift cover 300 from roaster bowl 200. Top handle 340 may be held by the operator during the glazing process, if desired. For instance, the operator, while holding a measuring cup filled with water in one hand, pours water into water reservoir 310 while holding the cover's top handle with the other hand (e.g., for balance or other reason). Since the cover's top handle 340 is disposed in the center of the cover, there is sufficient distance between both the top handle and the water reservoir, and the top handle and the steam vent, to allow the operator to safely hold the top handle during the glazing step.

Moreover, the relatively narrow, curved shape of water reservoir 310, which is disposed near the outer periphery of cover 300, prevents a hand holding the top handle 340 from getting burned by any steam that may come up through the metering holes 312 within water reservoir 310. Water reservoir 310, however, is sufficiently wide to allow an operator to easily pour water into the water reservoir using a standard measuring cup.

As discussed herein, and schematically shown in FIG. 7, steam vent 330, which is relatively long, is in the vicinity of the bowl's pouring lip 220, which advantageously causes all or nearly all of the steam that is produced during the nut glazing and cleaning processes to escape roaster bowl 200 at a location that is on a single side of the nut roaster. Thus, the steam is not directed out from the front or the immediate back of the nut roaster assembly, thereby minimizing the impact of the steam on the operator standing in front, and a wall, cabinet or other object that may be disposed behind the nut roaster assembly. As for impacting objects on the side of the nut roaster assembly where steam escapes during use (called herein, for convenience, the "evacuation side") (e.g., the right side shown in FIG. 7), that side is utilized to dispense the nuts from the bowl after being roasted/glazed, and also is the side from which the cleaning water is dispensed after the cleaning process, as shown in FIGS. 8 and 9. Therefore, a company or other user of the inventive nut roaster assembly generally would not place equipment, food, or other items near the evacuation side of the nut roaster assembly.

Moreover, by restricting the location of escaping steam (that very likely includes dissolved sugar), objects, shelves, and other items located behind, in front of, or at the non-evacuation side of the nut roaster assembly are not coated over time by a layer of sugar and thus minimizes the cleanup of these areas. The above-described metering of water into the roaster bowl via the water reservoir minimizes the size of the bursts of steam that are created, further reducing the amount of sugar that escapes and therefore minimizes the cleanup of surrounding areas.

(B) Bowl Movement: Cantilever with Pistons System

Nut roaster assembly 100 includes cantilever arm 120, shown in FIG. 1 and various other figures, along with other structure to be discussed herein (called "Cantilever with Pistons System" herein, for convenience) to enable the operator to lift and lower roaster bowl 200 safely and with certain advantages and benefits discussed herein.

Figure 17:
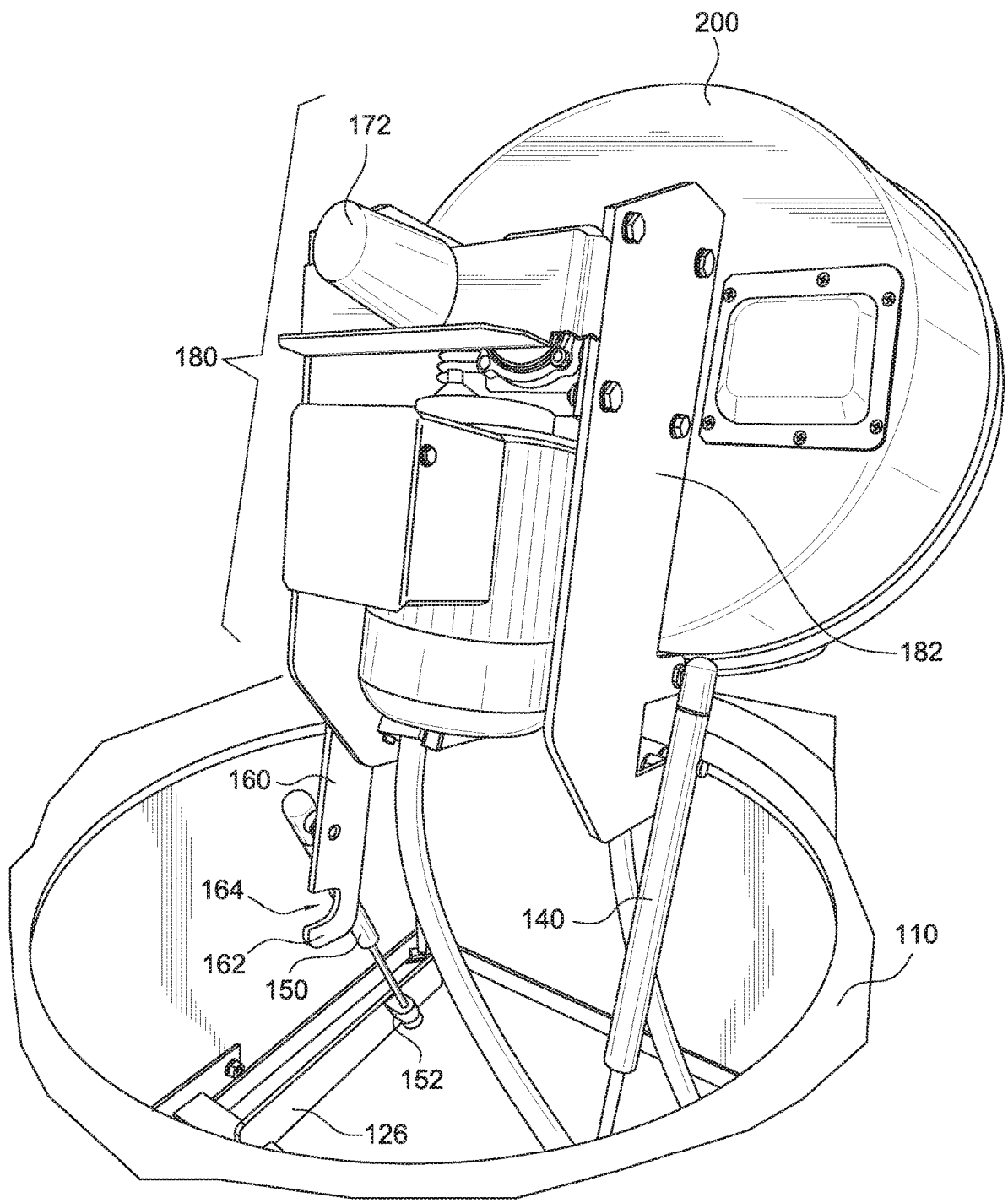

Cantilever arm 120 is coupled to nut roaster housing 110 via a sleeve bearing 122 shown in FIGS. 3 and 6B. Cantilever arm 120 optionally may include a grip (e.g., a rubber hand grip) on its open end. Cantilever arm 120 turns a lever arm shaft 124, shown in FIG. 6B. Lever arm shaft 124 is coupled to a bowl assembly 180 and serves to raise and lower roaster bowl 200. Bowl assembly 180 is shown in FIG. 17, which is discussed further below.

Figure 15:
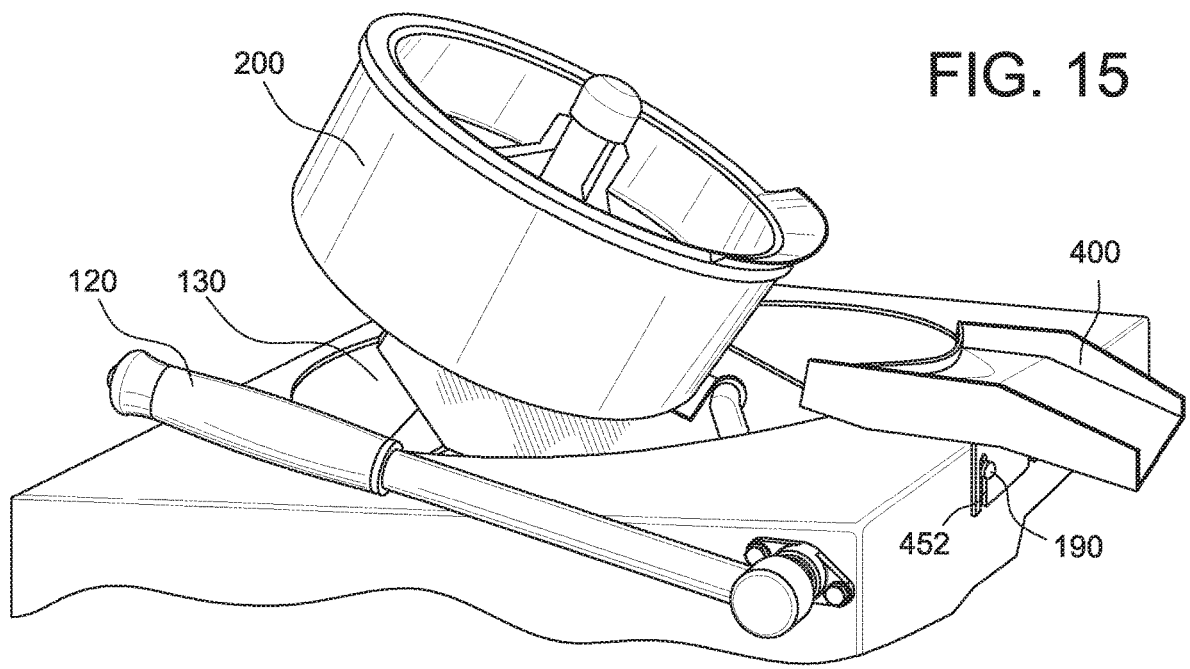
FIGS. 15 and 16 are schematic illustrations showing the roaster bowl in a partially raised position and the fully raised position, respectively, in accordance with the present invention.
Figure 16:
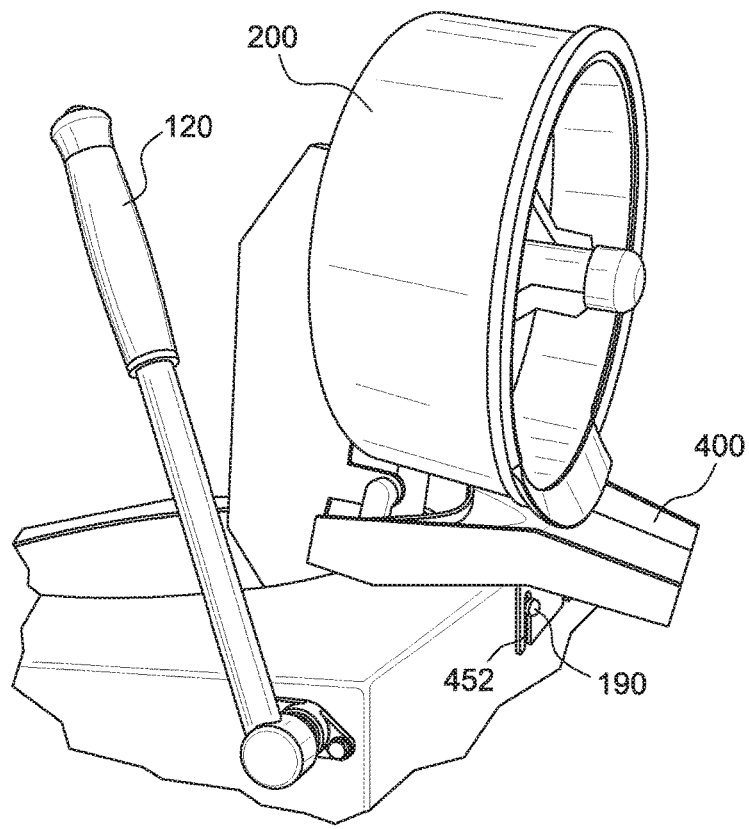

As discussed herein, roaster bowl 200 is raised and lowered after both the cooking and cleaning processes. The cross-sectional views of FIGS. 6A and 6B show roaster bowl 200 in the fully lowered position where it is disposed mostly within the nut roaster housing 110. FIG. 15 shows roaster bowl 200 disposed at roughly a 30° position, and FIG. 16 shows roaster bowl 200 disposed at a roughly 105° position (i.e., the fully raised position). FIG. 8 also shows roaster bowl 200 at the fully raised position at the completion of the glazing process. The roaster bowl's fully raised position may be any position at which the contents of roaster bowl 200 may easily be distributed onto a pan or tray, and includes angles between the range of 70° and 120° (or even higher if desired) relative to the top surface of housing 110, although a range of 95° to 110° is preferred.

Nut roaster assembly 100 employs a unique non-linear dampening system that enables the operator to easily lift roaster bowl 200 from its fully lowered position to its fully raised position and, conversely, to easily lower roaster bowl 200 from its fully raised position to its fully lowered position. Also, during such lifting and lowering, the non-linear dampening system prevents roaster bowl 200 from quickly falling (from any position) in the event the operator lets go of cantilever arm 120.

The inventive non-linear dampening system provides additional protection to prevent injury within a "falling zone." The falling zone is the region that includes housing opening 130 as well as the area immediately above opening 130 shown in FIG. 15. In particular, the falling zone includes any area that can be hit by roaster bowl 200 as it is lowered from the 30° position to the fully lowered position.

FIGS. 17-22 and 23A-23E collectively illustrate the non-linear dampening system. As shown in these various figures to be explained in detail below, two gas-dampened pistons 140, 150 and a rotating lever 160 are employed to assist and control the raising and lowering of roaster bowl 200.

Figure 18:
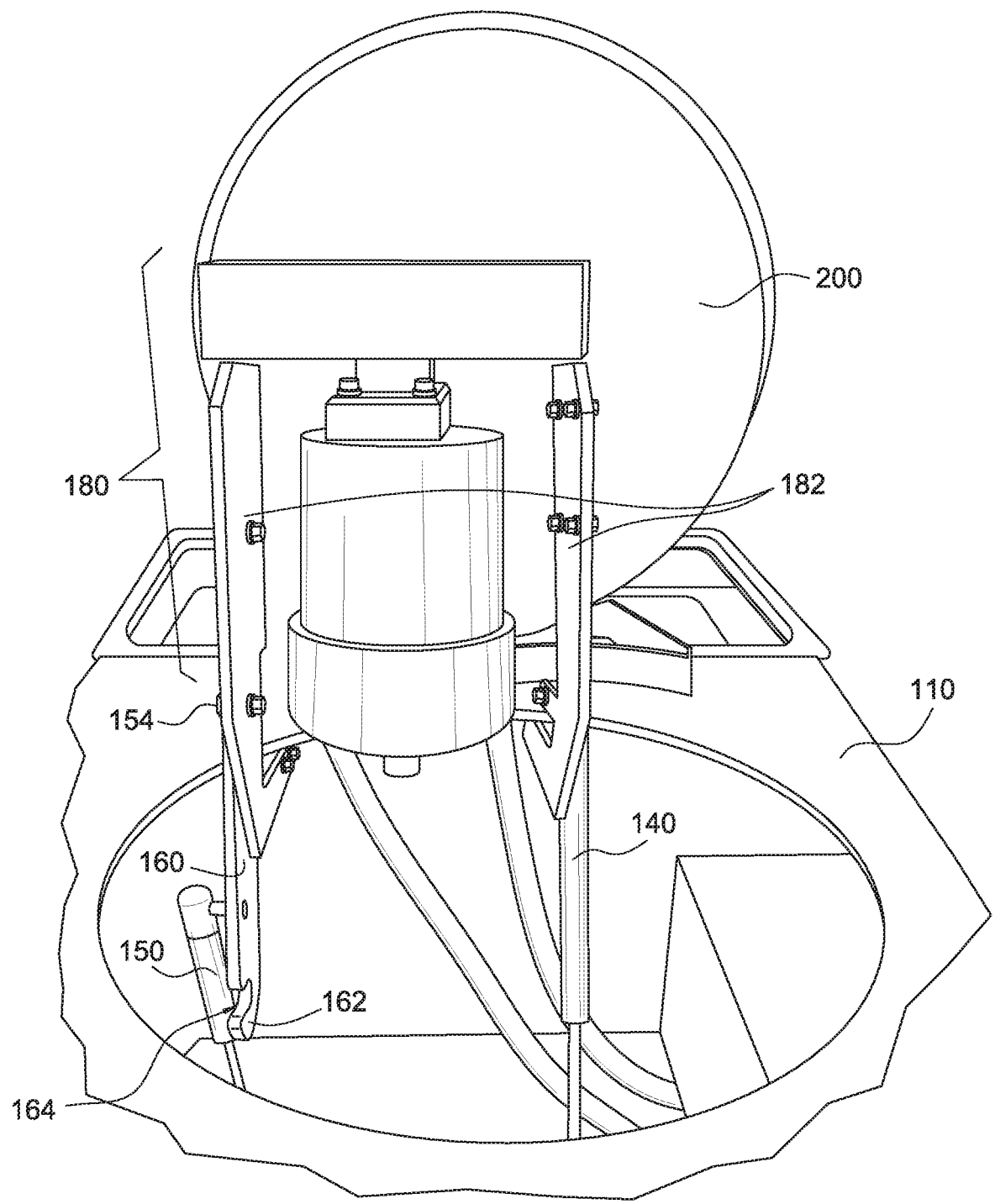
Figure 19:
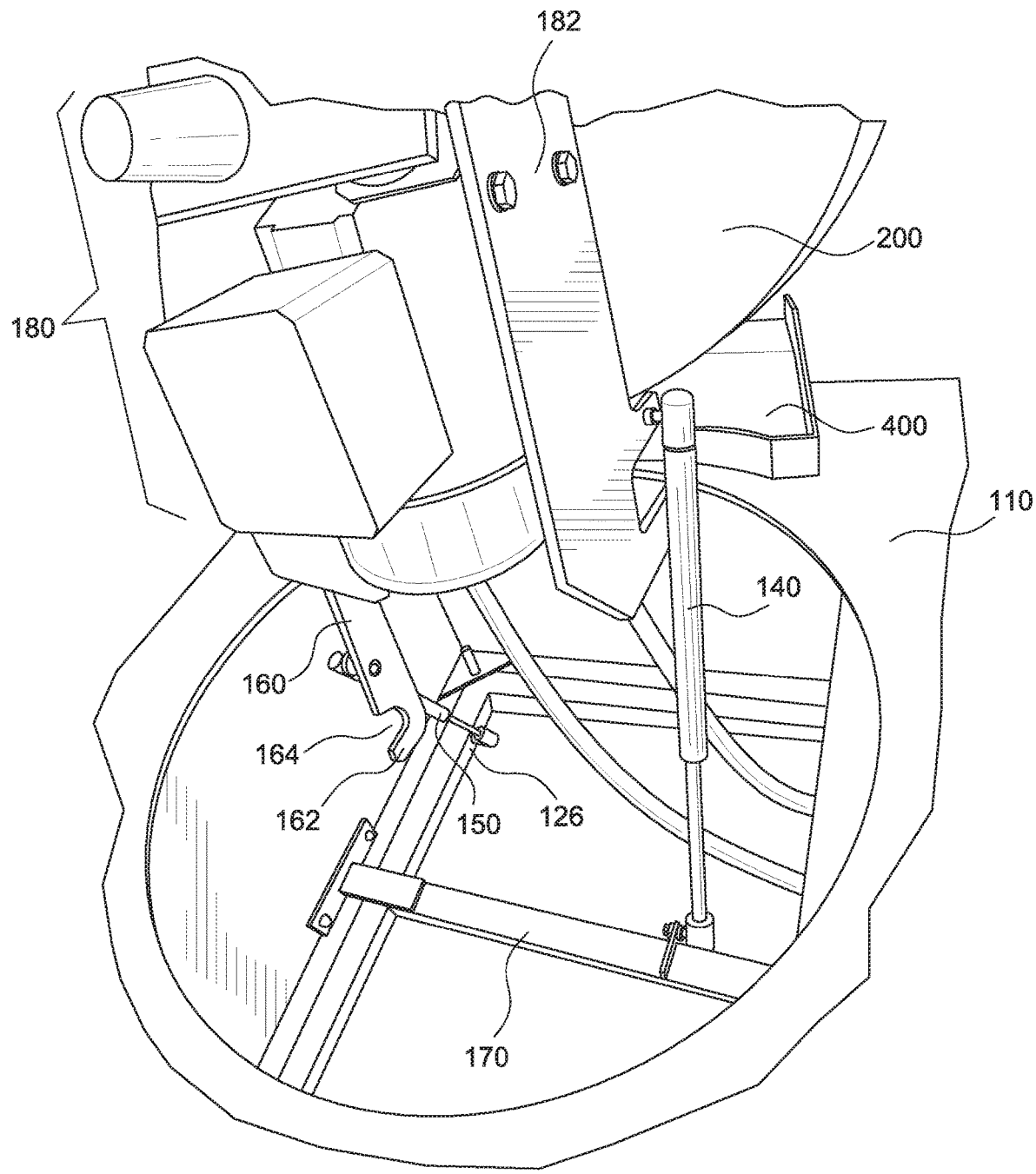
Figure 20:
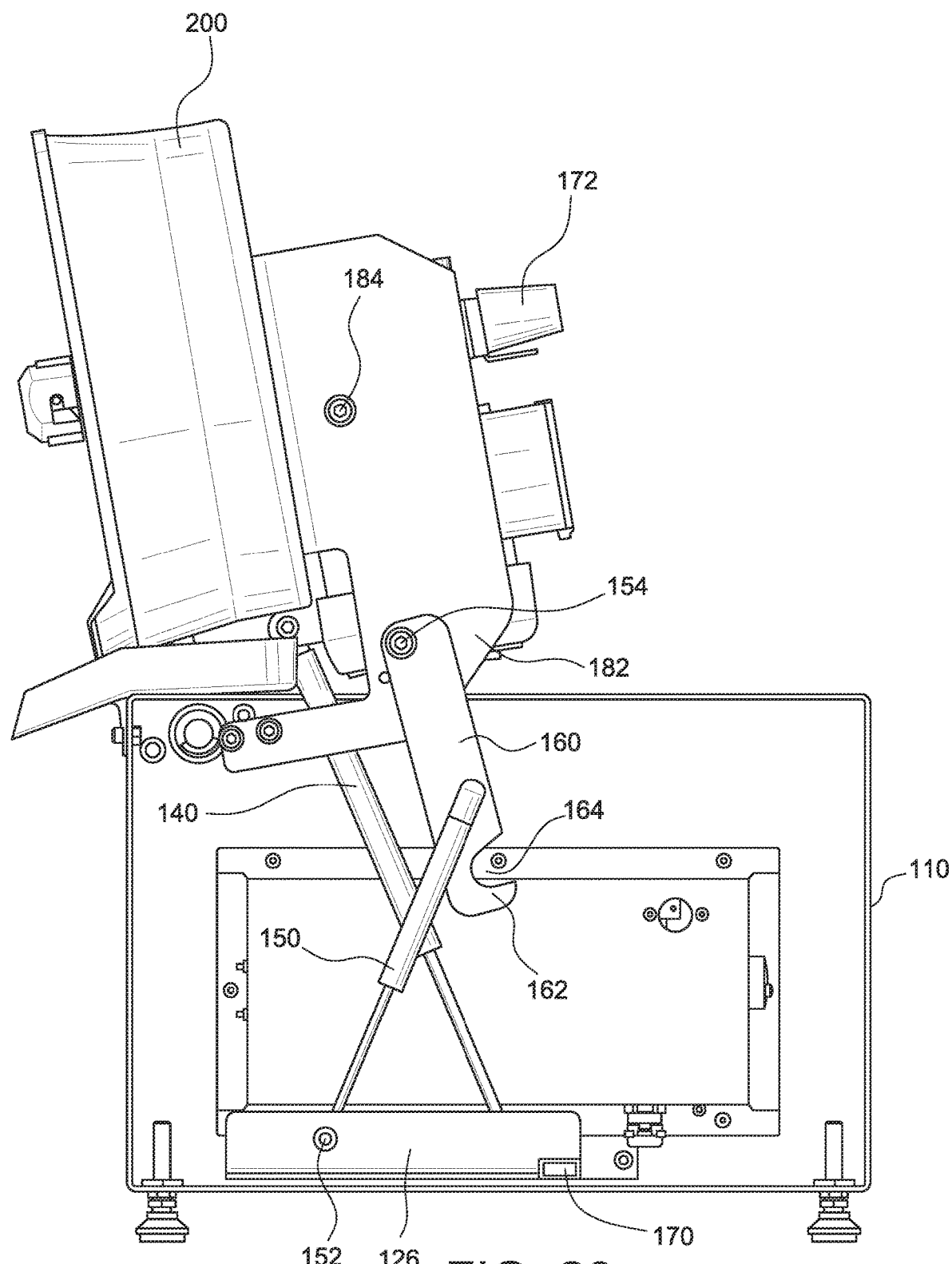

Piston 140 is a relatively large piston (and thus referred to herein as large piston 140) and is fully shown in FIGS. 19 and 20, and partially shown in FIGS. 17, 18 and 22. As best shown in FIGS. 17 and 19, large piston 140 is connected at one end to a bowl support 182 to which the bottom of roaster bowl 200 is fixed. As best shown in FIG. 19, large piston 140 is connected at its other end to a cross member 170 that extends across and near the center of the bottom of housing 110. FIG. 22 shows cross member 170, with large piston 140 coupled to the cross member.

Piston 150 is a relatively small piston (and thus referred to herein as small piston 150). Small piston 150 is fully shown in FIGS. 20 and 21 (and FIGS. 23A-23E discussed further below), and partially shown in FIGS. 17, 18, 19 and 22. As shown in these figures, small piston 150 is connected at one end to a mid-section of rotating lever 160. Small piston 150 is connected at its other end to a bracket 126, which is fixed to housing 110 (at connection point 152), as shown in FIGS. 17 and 19-22.

Figure 21:
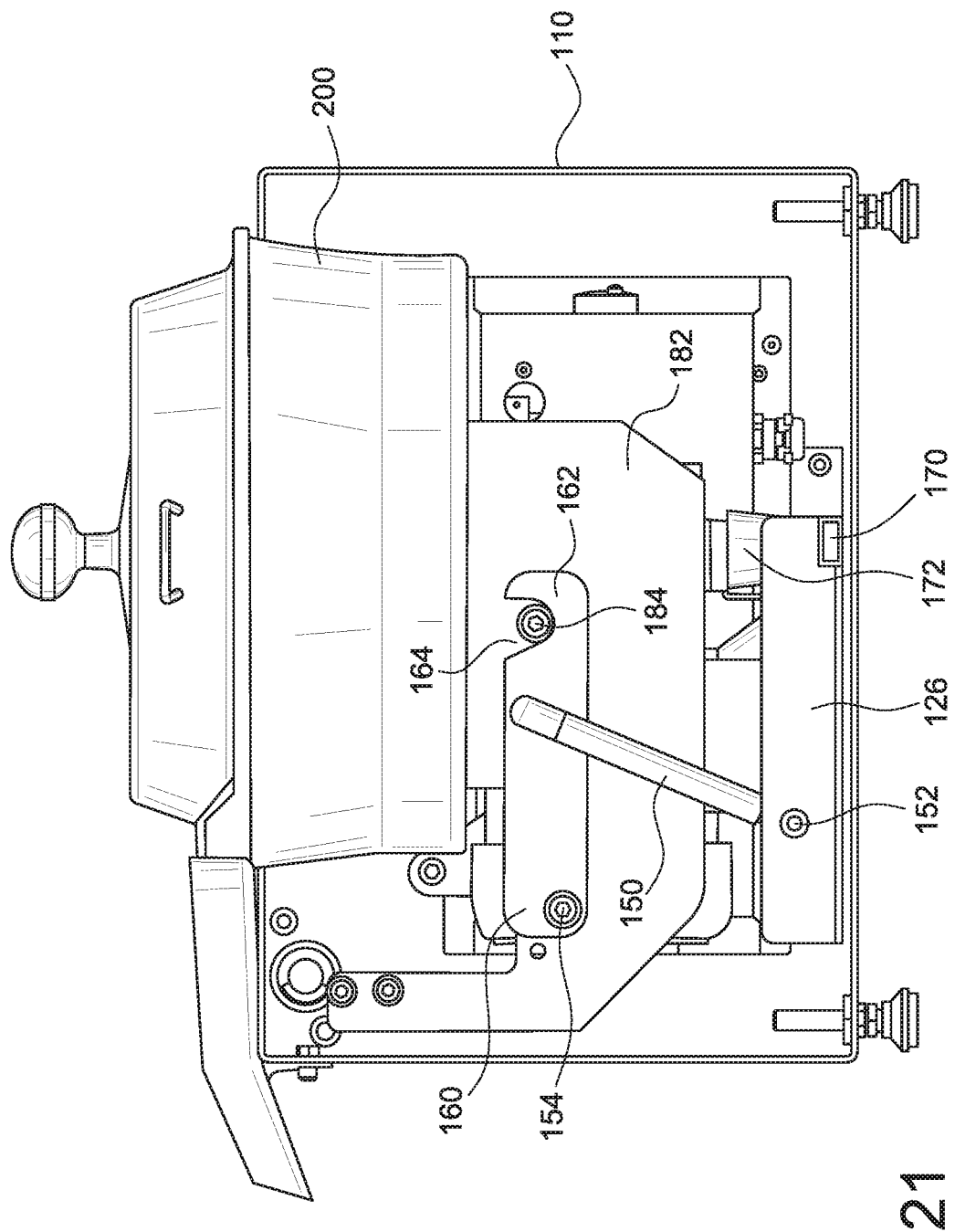

Rotating lever 160 also is connected at one end to bowl support 182 (at connection point 154), as shown in FIGS. 18, 20 and 21. Rotating lever 160 includes, at its other side, a hooked end 162 that includes an opening 164 (hooked opening 164). As further discussed below and explained with reference to FIGS. 23A-23E, lever 160 engages (at its hooked end 162) a pin 184 (e.g., peg) that extends from bowl support 182 when roaster bowl 200 is lowered from the 30° position to the fully lowered position. Small piston 150 is engaged during this time.

Each of the above-mentioned connections of large piston 140, small piston 150, and rotating lever 160 are pivot-type connections, and any appropriate technique or device to facilitate the pivot connection may be employed.

In the illustrative assembly, large piston 140 is a gas spring with a 140 mm stroke, 70 pounds nominal. Small piston 150 is a gas spring with a 90 mm stroke, 15 pounds nominal. Thus, the large piston provides a substantially greater counter force than the small piston. Such pistons/gas springs are well known in the art and thus further technical description herein is omitted. It should be noted that the pistons provided are merely exemplary, and other pistons with other strokes and characteristics may be employed. Moreover, pistons 140 and 150 may be of types different than gas springs.

Pistons 140 and 150 produce a counterforce to the weight of bowl assembly 180, which includes roaster bowl 200 and the components fixed thereto. For instance, roaster bowl 200 may weigh in the vicinity of 6 to 7 lbs. and the other components of the bowl assembly may weigh in excess of 10 lbs. Moreover, the weight of roaster bowl 200 includes its contents, such as nuts and/or water. Accordingly, the counterforce of the pistons thus provides the operator of nut roaster assembly 100 controlled ascent and descent of bowl assembly 180.

As explained herein, roaster bowl 200 is lifted after the cooking process to its fully raised position in order to allow the roasted/glazed nuts to be easily removed, as illustrated in FIG. 8. Similarly, after the cleaning process, roaster bowl 200 is gradually lifted to cause the hot sugar water within the roaster bowl to be poured onto pouring tray 400 and then into a pan 600, as illustrated in FIG. 9. As the sugar water leaves the bowl, the operator continues to raise cantilever arm 120 until roaster bowl 200 is at the fully raised position. During this lifting operation, large piston 140 aids the operator in the lifting of roaster bowl 200.

When roaster bowl 200 is at the fully raised position (or at any lower position, if desired), the operator lowers the roaster bowl by lowering cantilever arm 120. While lowering, large piston 140 is engaged and serves to counteract the downward force of the roaster bowl being lowered (including the gravitational force). By counteracting the downward force, roaster bowl 200 is gradually lowered.

Small piston 150 is engaged only during a portion of the lowering of roaster bowl 200. Specifically, small piston 150 is not engaged until roaster bowl 200 is lowered to the 30° position and remains engaged until roaster bowl 200 is completely lowered. The operation of small piston 150 is explained below with reference to FIGS. 23A-23E. As will be appreciated from the description herein, the operation of small piston 150 as herein described completely prevents (or at least significantly minimizes) injury within the above-identified "falling zone."

Figure 23A:
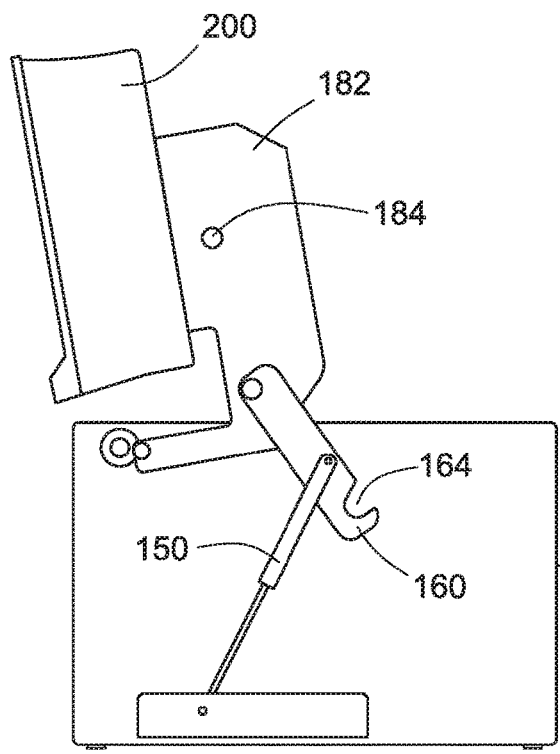
FIGS. 23A-23E are schematic illustrations that show the roaster bowl at different raised/lowered positions and further used to describe the operation of the non-linear dampening system of the present invention.
Figure 23B:
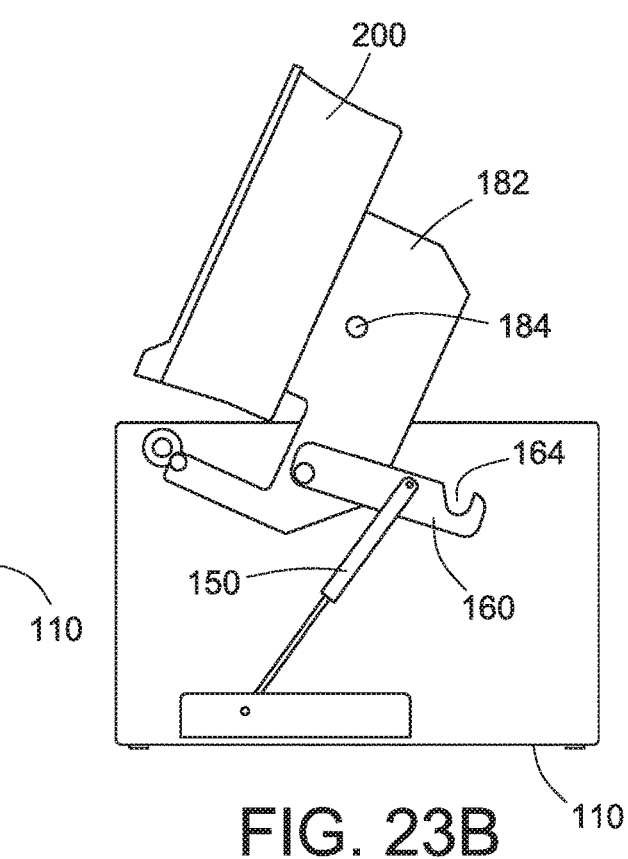
Figure 23C:
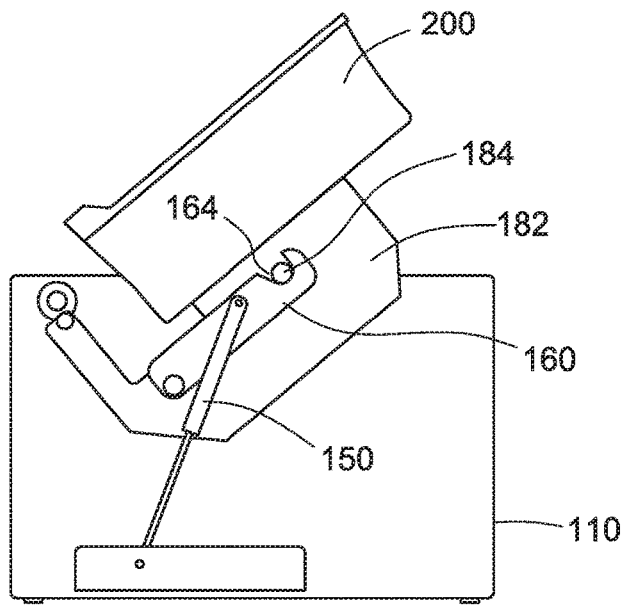
Figure 23D:
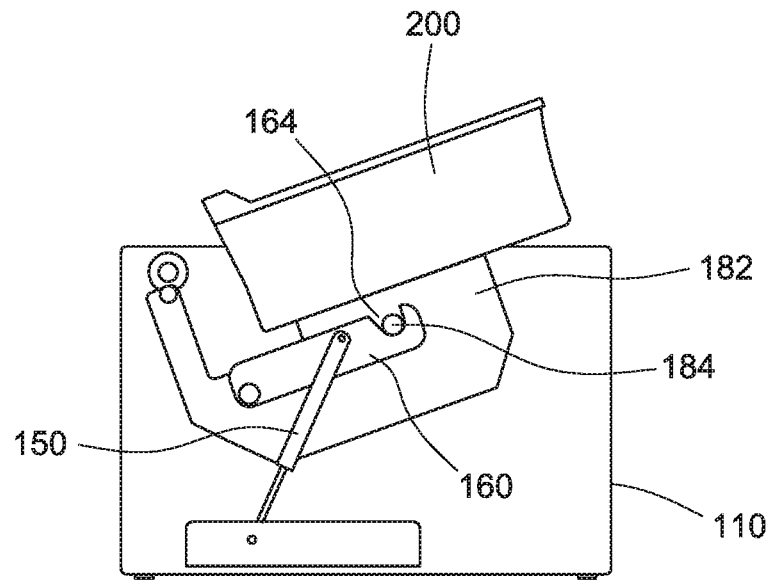
Figure 23E:
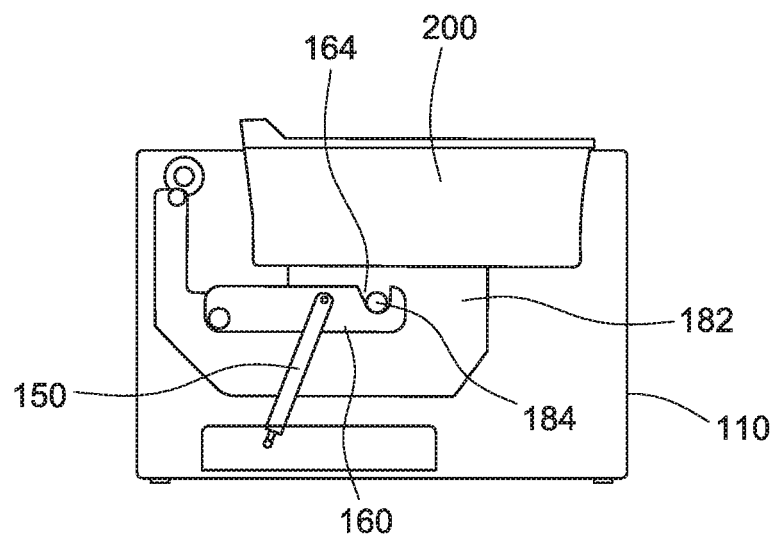

FIGS. 23A-23E show roaster bowl 200 at various positions. FIG. 23A shows roaster bowl 200 at the fully raised position. FIG. 23B shows roaster bowl 200 at a slightly lowered position (i.e., at roughly a 65° position). FIG. 23C shows roaster bowl 200 at the 30° position. FIG. 23D shows roaster bowl 200 at a 15° position. FIG. 23E shows roaster bowl 200 at the fully lowered position.

FIGS. 23A-23E also simply illustrate housing 110, bowl support 182, pin 184, small piston 150 and rotating lever 160 so that the respective positions of each of these components are illustrated. Large piston 140 and other components of the nut roaster assembly are not provided in FIGS. 23A-23E so as to not obscure these figures.

As indicated above, FIG. 23A shows roaster bowl 200 at the fully raised position. As roaster bowl 200 is lowered from this position, rotating lever 160 freely rotates upwards (counter-clockwise) thus preventing small piston 150 from being engaged (i.e., from being compressed). This is shown in FIG. 23B. Roaster bowl 200 is further lowered until it reaches the 30° position shown in FIG. 23C. As illustrated in FIG. 23C, small piston 150 is uncompressed. Accordingly, during the roaster bowl's entire movement between the fully raised position (FIG. 23A) and the 30° position (FIG. 23C), small piston 150 is not engaged.

However, at the 30° position shown in FIG. 23C, rotating lever 160 has rotated upwards to the point where the rotating lever's hooked end is in contact with pin 184 that extends from bowl support 182. Rotating lever 160 therefore is prevented from further upward rotation.

Accordingly, continued lowering of roaster bowl 200 beyond the 30° position causes small piston 150 to be engaged. The operator therefore must exert sufficient downward force on cantilever arm 120 to overcome the counteracting force of small piston 150.

As the operator exerts the required downward force, the counteracting force of small piston 150 causes roaster bowl 200 to be lowered at a very gradual rate. Such gradual rate is sufficiently slow to allow the operator and other individuals plenty of time to move body parts and other items that may be located within the above-mentioned falling zone.

FIG. 23D shows roaster bowl 200 at the 15° position, and at such position, small piston 150 is shown partly compressed while rotating lever 160 continues to abut pin 184 of bowl support 182. As roaster bowl 200 is further lowered by the operator to the fully lowered position shown in FIG. 23E, small piston 150 continues to be engaged, thus continuing to cause the very gradual (and thus very safe) lowering of roaster bowl 200.

Accordingly, by employing the herein-described Cantilever with Pistons System, roaster bowl 200 cannot accidentally (or even intentionally) move between the various positions too quickly so as to pose a threat of physical injury.

In addition, the use of small piston 150 with rotating lever 160 as herein described provides enhanced safety when the roaster bowl is relatively close to the top surface of the nut roaster assembly's housing (i.e., between the 30° and fully lowered positions). Accordingly, an object, a person's finger or anything else located within the falling zone may easily be removed to prevent injury or damage during the final lowering of the roaster bowl into its fully lowered position.

The particular height of roaster bowl 200 at which the small piston is engaged may be different than that explained above. For example, the structure of the components may be modified to cause the small piston to be engaged after the roaster bowl is lowered to a 35° position, or a 25° position, or other desired position.

(C) Steam Cleaning and Detachable Pour Tray

Nut roaster assembly 100 of the present invention includes pour tray 400, shown in various figures, including FIGS. 1-3, 6A, 9, 15, 16 and 24A. Pour tray 400 is removably attachable to the nut roaster's housing 110 in a manner to be described, and is utilized during the herein-described nut roaster cleaning process and, in particular, is utilized to evacuate the water from roaster bowl 200 after the herein-described steam cleaning phase of the cleaning process is complete.

As discussed above, to clean the various components including roaster bowl 200, agitator 230, and cover 300, the operator adds water to roaster bowl 200, places cover 300 over the roaster bowl, and depresses Clean button 580 on the front panel 500 to initiate the clean cycle. During the clean cycle, roaster bowl 200 is heated until the water begins to boil. As the water is boiling, steam is created that dissolves the stuck-on sugar. As mentioned above, this process is called, for convenience, the steam-cleaning phase.

As shown in FIGS. 7 and 11, pouring lip 220 of roaster bowl 200 extends partially outward and upward from the bowl's perimeter 222. As steam is created, the steam fills the space between roaster bowl 200 and cover 300, and ultimately is forced to exit through steam vent 330. During this steam cleaning phase, that is, as steam is continuously being created from the boiling water, the entire underside of cover 300 and most of the internal surface of roaster bowl 200 are cleaned such that all (or at least most) of the sugar that is adhered to any of these surfaces is dissolved within the steam, hot water vapor and boiling water. Some of the steam and hot water vapor exit the chamber via steam vent 330. For convenience, the term steam herein refers to both steam and hot water vapor.

In accordance with the present invention, the steam exiting the chamber via steam vent 330 cleans the bowl's pouring lip 220. In particular, as the steam exits, some of the exiting steam contacts the top surface of pouring lip 220, which condenses on the pouring lip, dissolves sugar that is adhered to the pouring lip, and drips back (along with the dissolved sugar) into roaster bowl 200.

Pouring lip 220 has a particular shape and length. This entails a pouring lip that does not extend too far from the perimeter of roaster bowl 200, otherwise the steam exiting via steam vent 330 during steam-cleaning does not sufficiently remove sugar that may be adhered to the outer edge of pouring lip 220 (i.e., that portion of pouring lip 220 furthest from the roaster bowl). That is, steam exiting the roaster bowl through the steam vent is able to clean only a finite length of the pouring lip. A particularly suitable length of the pouring lip is 0.75 inches, upwards of 1 inch (and all lengths smaller), although quality of cleaning is reduced at much longer lengths. For example, a pouring lip with a length as long as 3 inches is not properly cleaned at the areas furthest from the roaster bowl.

Hence, by limiting the extension of the roaster bowl's pouring lip as particularly shown in the figures, the entire pouring lip is able to be sufficiently cleaned during the herein-described steam cleaning phase.

At the conclusion of the clean cycle, the operator removes cover 300 and then proceeds to pour out the hot water (with the sugar dissolved therein—also called "sugar water" herein, for convenience) within roaster bowl 200 using pour tray 400. As further discussed below and as generally shown in FIG. 9, pour tray 400 is first connected to nut roaster housing 110, a suitable bucket, pan or tray (e.g., pan 600) is placed under pour tray 400, and the operator lifts cantilever arm 120 to raise roaster bowl 200 to a height sufficient to allow the sugar water within roaster bowl 200 to flow onto pour tray 400, which directs the sugar water into the bucket, pan or tray.

Thereafter, the various components, including the roaster bowl, agitator, cover, pour tray and other accessible components, are cleaned to remove all remaining residue.

Detachable Pour Tray

Referring again to FIGS. 1-3, pour tray 400 is shown to have a proximal end 410 and a distal end 420. The pour tray's proximal end 410 includes a curved edge 430 with a curvature that generally follows the curvature of the outer edge of pouring lip 220, as best shown in FIG. 3. Curved edge 430 is longer than pouring lip 220 to prevent spillage of the sugar water as it is being poured onto pour tray 400 from pouring lip 220. The pour tray's distal end 420 is narrower than the pour tray's proximal end 410 to further facilitate pouring of the sugar water into the separate bucket or pan. Pour tray 400 further includes a sidewall 440 extending upward from the two side edges and the curved edge to also prevent or, at least, minimize spillage during pouring, as illustrated in FIG. 9.

As shown in FIG. 2, the top surface of the pour tray's proximal end 410 is sloped at its edge that flows into a flat portion that rests on the top surface of nut roaster housing 110, when mounted thereon. The pour tray's distal end 420 is sloped downward to further facilitate pouring of the sugar water into the adjacent bucket or pan. This also is shown in FIGS. 9, 15 and 16.

FIGS. 15 and 16 show the relative size of pour tray 400 and the positions of its components when roaster bowl 200 is at the partially raised position (FIG. 15) and at the fully raised position (FIG. 16). As illustrated, pour tray 400 catches water poured over the roaster bowl's pouring lip when the roaster bowl is at any raised position, thus minimizing spillage during the pouring operation. Of course, the operator needs to raise roaster bowl 200 carefully and in a measured manner to ensure that there is no spillage of the water during any pouring operation that may be carried out.

Pour tray 400 further includes structure to enable it to be mounted on the nut roaster's housing. FIG. 24A shows a perspective, bottom view of pour tray 400. As shown, pour tray includes a support member 450 that extends downward from the pour tray's lower surface. Support member 450 includes two elongated engagement apertures 452. To facilitate mounting, the nut roaster's housing 110 includes a pair of mounting pins 190 that extend from the upper, side surface of the nut roaster's housing 110, as best shown in the perspective, bottom view of FIG. 22. As shown in FIG. 24B, each mounting pin 190 is cylindrical in shape and includes a rounded terminus 192.

To mount pour tray 400 on the nut roaster's housing 110, pour tray 400 is positioned above and adjacent to the top, side edge of the nut roaster's housing 110 so that the pour tray's two engagement apertures 452 are immediately above the two mounting pins 190 extending from the housing, and then the pour tray is lowered until the mounting pegs are within the pour tray's engagement apertures, as shown in FIG. 22.

The pour tray rests on the top surface of the nut roaster's housing 110, as best seen in FIG. 2. Mounting pins 190 disposed within the pour tray's engagement apertures 452 keep the pour tray in place during use (see FIG. 22). After completion of pouring of the sugar water from roaster bowl 200 into a bucket or pan, the pour tray is lifted up to be removed, and is then easily cleaned in a sink.

Mounting pins 190 on the nut roaster housing may have a structure different than that shown and described herein. Moreover, the mechanism to secure the pour tray to the nut roaster housing may be different. Other techniques/structure known in the art to temporarily attach the pour tray to the nut roaster housing may be employed.

From the description herein, it is illustrated that the inventive nut roaster includes elements and features that maximize the effectiveness of the cleaning operation, while preventing or otherwise minimizing the need to separately clean the bowl's integral pouring lip, and preventing or otherwise minimizing the flow of steam (containing dissolved sugar) towards the front or back of the nut roaster assembly. Still further, the bowl's pouring lip, in combination with the detachable pour tray, prevents or otherwise minimizes spillage of the very hot (or boiling) water onto the floor, onto the counter on which the roaster sits, onto the top surface of the nut roaster or other component or piece of machinery.

(D) Agitator and Bowl

Nut roaster assembly 100 of the present invention includes the inventive agitator 230 within the roaster bowl that mixes the nuts, sugar and other ingredients during the herein-described nut roasting process. The inventive agitator 230 has various structural features that provide certain benefits and advantages not provided by agitators used in currently available nut roasters.

In particular, agitator 230, shown installed within roaster bowl 200 in FIG. 4A, beneficially avoids or minimizes seizing, prevents or minimizes formation of thick coatings of hard sugar build-up on and under the agitator's blades, prevents incremental build-up of sugar on and under the agitator over multiple cooked batches, beneficially provides for even interspersing of the mixture throughout the roaster bowl, minimizes mere pushing of the bowl contents around the roaster bowl thus increasing consistency in nut coating, minimizes production of scrap, and prevents adherence of the agitator to the bowl after the roaster bowl has cooled (after the cooking process is complete), among other features, benefits and advantages.

As shown in FIGS. 4A and 4B, agitator 230 is installed over a center column 202 extending upwards from the bottom of roaster bowl 200. When properly installed, agitator 230 is connected to the top of drive shaft 116, which extends through the bowl's center column 202, as further discussed below.

Figure 25F:
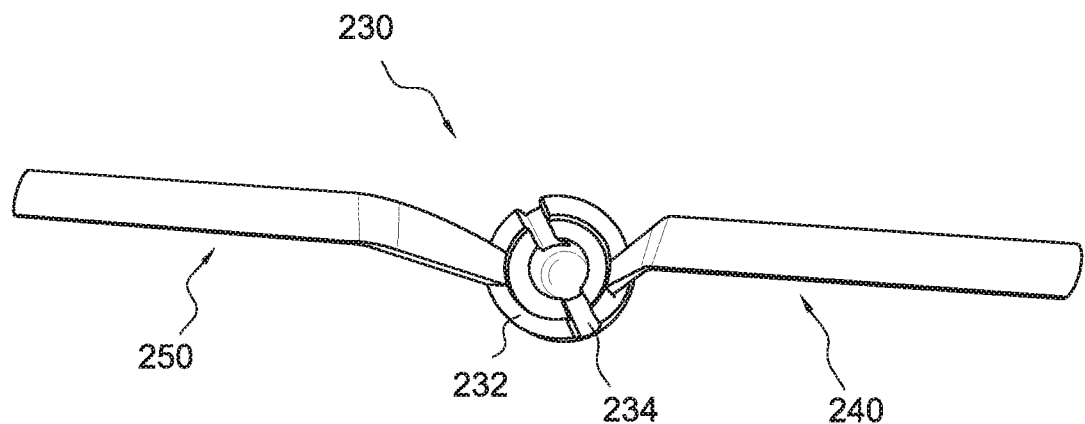
Figure 25G:
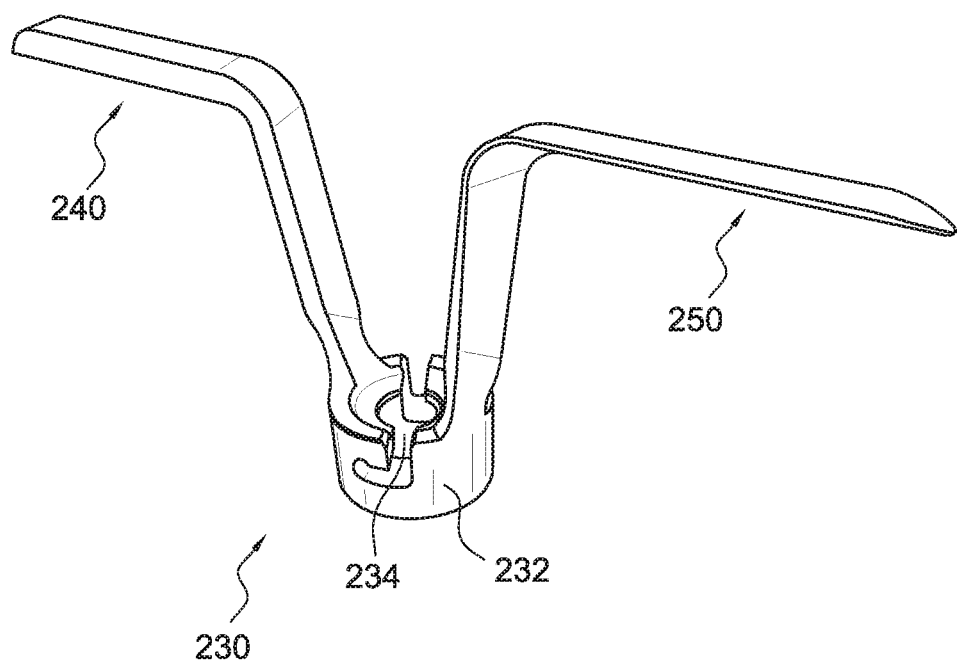
Figure 26:
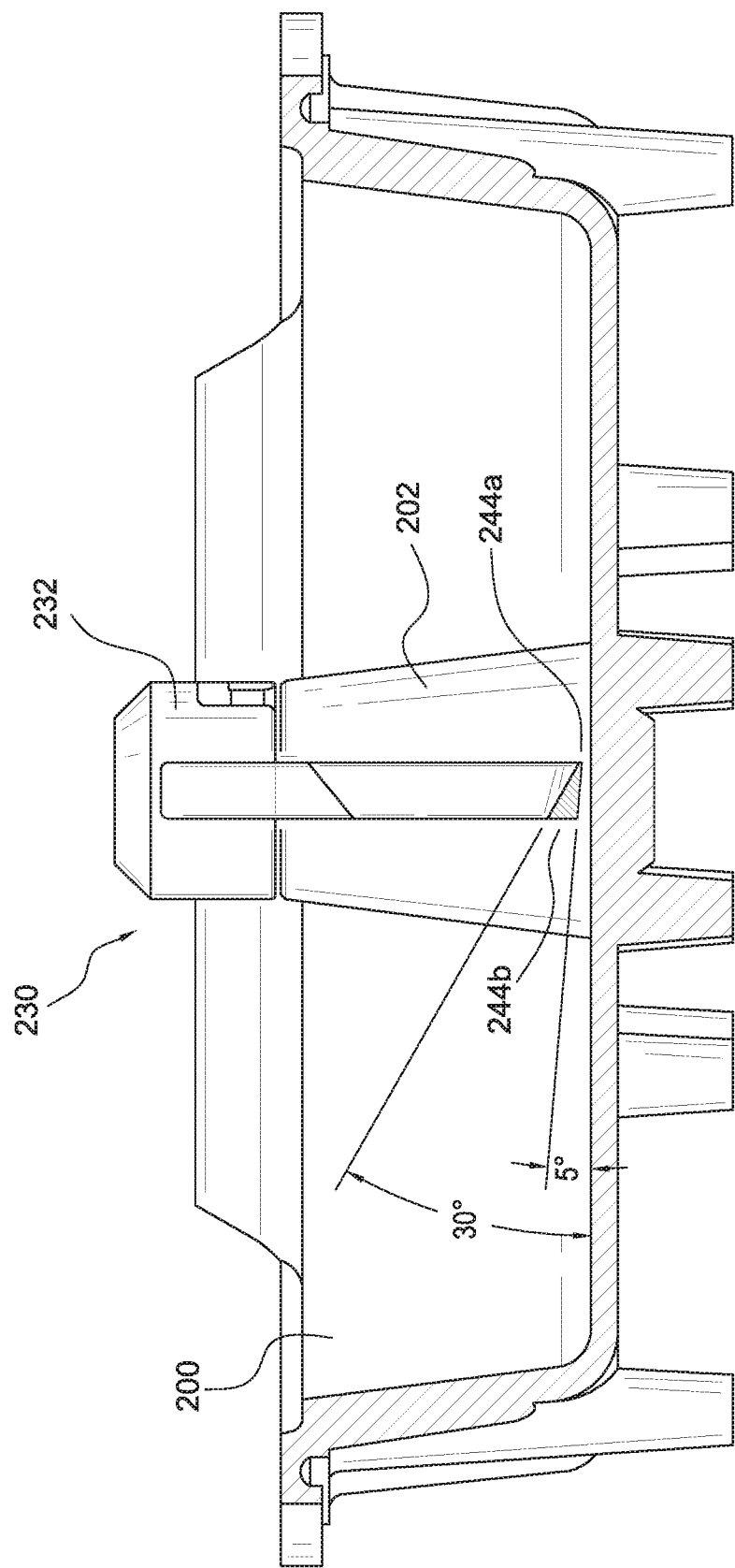
FIG. 26 is a schematic illustration of a cross-sectional view of the roaster bowl and the installed agitator of the present invention.

FIGS. 25A-25G are various views of agitator 230. FIG. 25A is a perspective view. FIG. 25B is a top view. FIG. 25C is a front view. FIG. 25D is a side view. FIG. 25E shows an enlarged portion of the side view of FIG. 25D. FIG. 25F is a bottom view. FIG. 25G is another perspective view. Moreover, FIG. 26 is a cross-sectional view of roaster bowl 200 with installed agitator 230.

As shown in FIGS. 25A, 25B, 25C, 25F and 25G, agitator 230 includes a central hub 232 and two blades 240, 250. The two blades extend from opposite sides of central hub 232 and are identical in all respects. As particularly shown in FIG. 25C, blades 240, 250 are L-shaped and include a somewhat vertical (i.e., slightly slanted) component (242, 252) (for convenience, called "vertical component") extending downward from central hub 232 and then bend (slightly more than 90°) into an outwardly extending horizontal component (244, 254). As best shown in FIG. 25B, blades 240, 250 are relatively narrow in width as compared to the size of central hub 232. In particular, central hub 232 has a diameter that is roughly four times longer than the width of the blades.

When agitator 230 is installed within roaster bowl 200, as shown in FIG. 4A, each blade's vertical component is adjacent and parallel to center column 202 that extends upward from the bottom of roaster bowl 200, and each blade's horizontal component is disposed immediately above and parallel to the floor of roaster bowl 200.

As shown in FIG. 25A, the horizontal component of blade 240 includes a front edge 244a and a rear edge 244b. Likewise, the horizontal component of blade 250 includes a front edge 254a and a rear edge 254b.

The horizontal component of each blade 240, 250 has angled top and bottom surfaces. As best shown in FIG. 26, each blade's top surface (of the horizontal component) extends upward from the blade's front edge to the blade's rear edge at an angle of 30° relative to the floor of roaster bowl 200. FIG. 25A also shows each blade with an angled top surface.

Moreover, each blade's bottom surface extends upward from the front edge to the rear edge at a relief angle of 5° relative to the floor of roaster bowl 200, which is shown in FIGS. 25E and 26. Accordingly, each blade's front edge (244a, 254a) is relatively thin as compared to the thickness of each blade's rear edge (244b, 254b).

Agitator 230 also includes a notch 234 with the shape shown in FIGS. 4A, 4B, 25A, 25F and 25G to enable the agitator to be secured to the top of drive shaft 116. As shown in FIG. 4B, drive shaft 116 includes a pair of outwardly extending pins 204. To secure agitator 230 to drive shaft 116, agitator 230 is placed immediately above the bowl's center column 202, and agitator 230 is rotated to align the outer openings of the agitator's notch 234 with the positions of pins 204. Agitator 230 is pushed downward and onto drive shaft 116 to cause pins 204 to move up and into notch 234. Then, to secure the agitator within the roaster bowl, agitator 230 is turned clockwise to move pins 204 into the closed ends of notch 234.

Figure 6C:
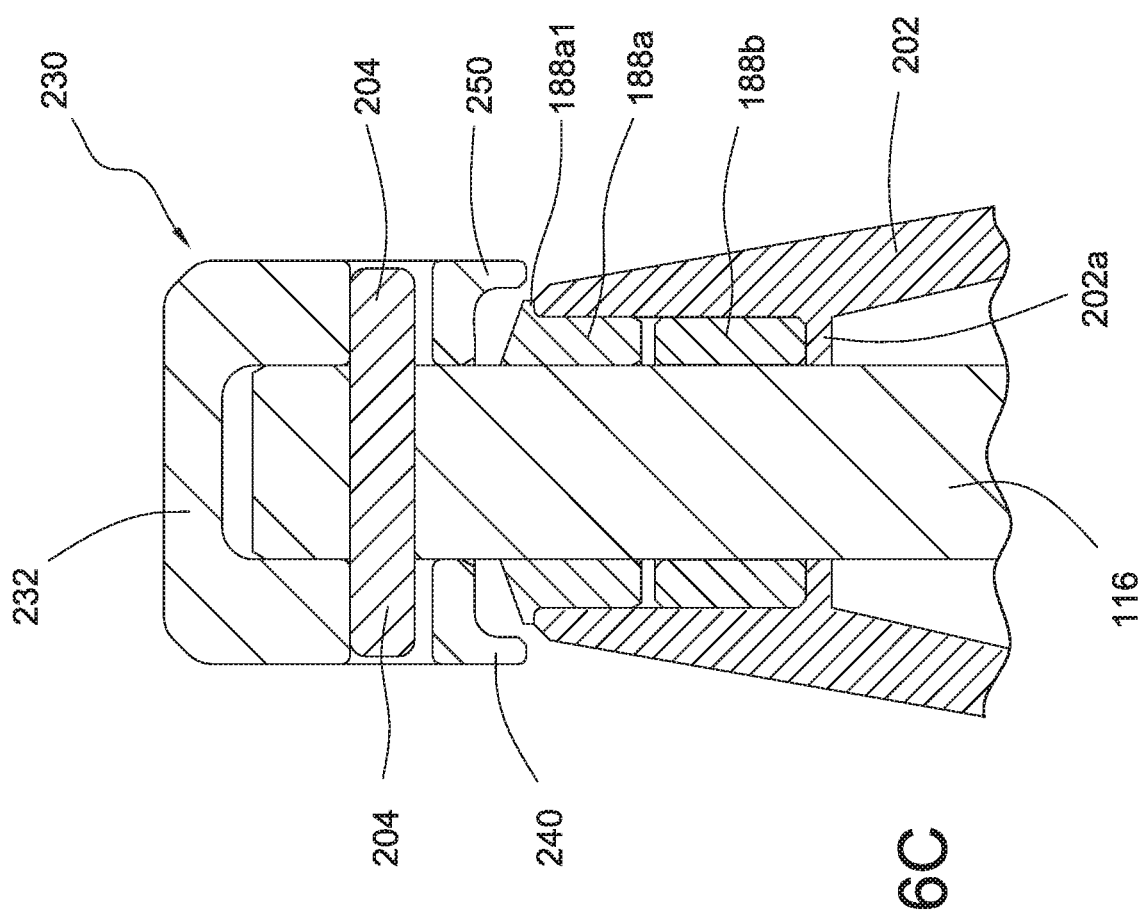
FIG. 6C is an enlarged view particularly showing the top of the drive shaft extending upwards through the roaster bowl's center column.

Referring to FIGS. 4A, 4B, 6A and 6B, agitator 230 is connected to the top of drive shaft 116 which extends through the roaster bowl's center column 202. FIG. 6C is an enlarged view that particularly shows the top of drive shaft 116, the agitator's central hub 232 and the top of the roaster bowl's center column 202. FIGS. 6B and 6C show only a small portion of the agitator's two blades 240, 250 (reference numbers 240, 250 are omitted in FIG. 6B for purposes of ease of readability).

As also shown in FIGS. 6A and 6B, drive shaft 116 is coupled at its bottom end to gearbox 114, which is driven by motor assembly 112 during operation of nut roaster assembly 100. Accordingly, when the motor of nut roaster assembly 100 is powered, the agitator's blades 240, 250 rotate. During such rotation, the agitator's blades 240, 250 mix the contents in roaster bowl 200.

During the herein-described operation of nut roaster assembly 100, and particularly during the roasting and glazing processes, blades 240, 250 rotate around roaster bowl 200 and during such rotation lift the ingredients (e.g., nuts and sugar) as each blade passes through the mixture. By employing blades that have a short width and that have a top surface angle of 30°, the mixture moves fluidly over the blades. Moreover, the blade structure lifts and rotates components of the mixture (i.e., the nuts) during blade rotation, as further discussed below.

Figure 27C:
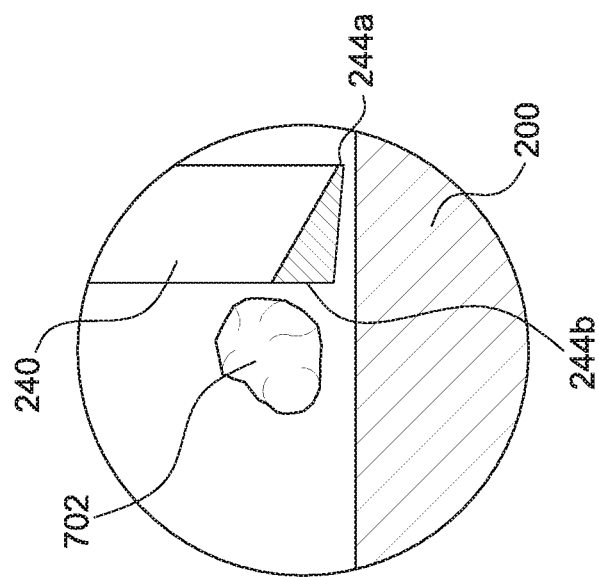
FIGS. 27A-C are schematic illustrations used to discuss the operation of a blade of the agitator during a mixing operation of the present invention.
Figure 27B:
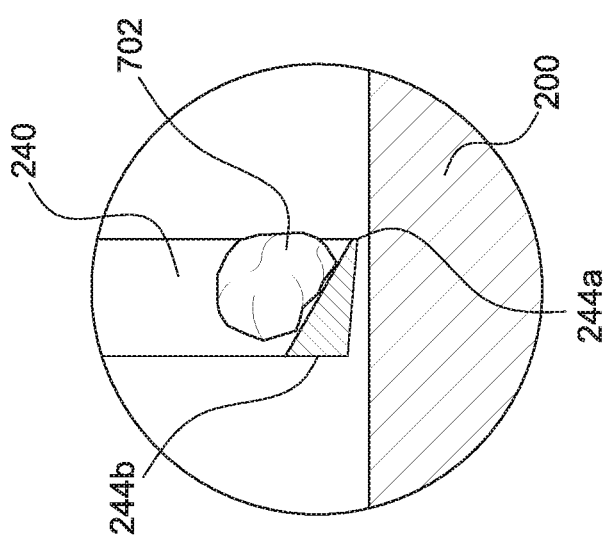
Figure 27A:
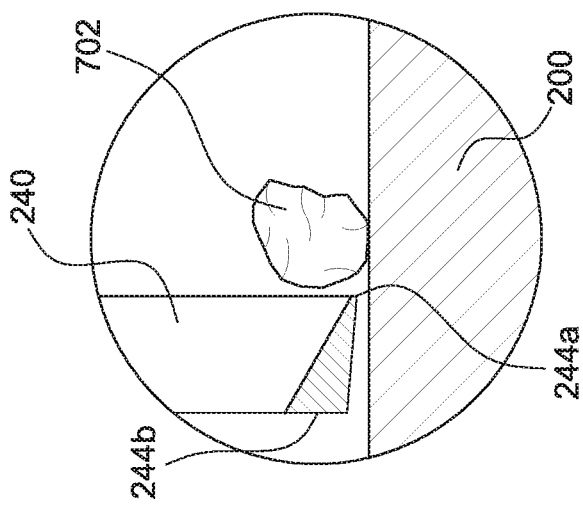

FIGS. 27A-27C illustrate the movement of an individual nut 702 within a mixture in roaster bowl 200 as blade 240 rotates. Front edge 244a of blade 240 approaches nut 702, as shown in FIG. 27A. As blade 240 continues to rotate, the blade's front edge 244a contacts nut 702 and forces the nut to tumble up the blade's top surface, where the orientation of nut 702 has changed due to such tumbling, as illustrated in FIG. 27B. As blade 240 continues to rotate, nut 702 tumbles past the blade's rear edge 244b, further changing the nut's orientation, as illustrated in FIG. 27C. In addition to changing its orientation, the height of nut 702 within the mixture (relative to the floor of roaster bowl 200) also has changed by being forced upwards as each blade passes under the nut, which promotes enhanced mixing of the mixture and greater consistent coating of each nut's entire surface.

Figure 28:
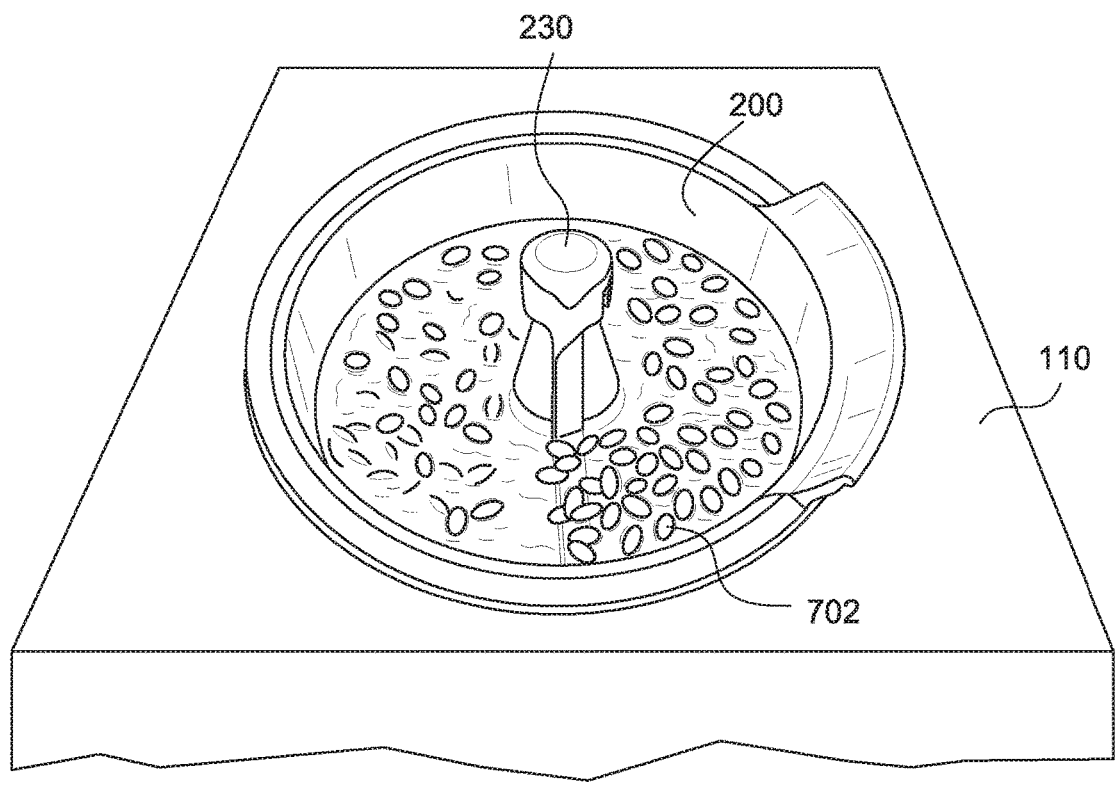
FIG. 28 schematically illustrates the mixing of nuts within a mixture in the roaster bowl in accordance with the present invention.

FIG. 28 schematically illustrates nuts within the mixture tumbling over the agitator's blade during rotation.

As discussed herein, the lower surface of each blade is relatively close to the floor of roaster bowl 200 and extends upward from the front edge to the rear edge at an angle of 5°, as shown in FIG. 26. More particularly, the distance between the bottom of the front edge of each blade and the floor of roaster bowl 200 is substantially smaller than the size of most nuts and nut pieces and, therefore, the nuts and nut pieces within the mixture are forced up the blade's top surface, rather than moving underneath the blade.

In addition, the sugar, the melting sugar and other ingredients within the mixture similarly pass over each blade, rather than under the blade, during the mixing/roasting/glazing processes. However, a relatively small amount of mixture, including possibly tiny nut fragments, sugar crystals, and other tiny components of the mixture, will flow under each of the blades during rotation. The 5° upward angle of the bottom surface of each blade minimizes the chance of such components interfering with continued blade rotation. That is, each blade is closest to the floor of the nut roaster only at the blade's front edge 244a, as shown in FIGS. 26 and 27A-C. Thus, mixture components sufficiently small to pass under the bottom surface of the blade, at the blade's front edge 244a, will continue to pass under the remainder of the blade's bottom surface (as the blade rotates) due to the continuously increasing distance between the blade's bottom surface and the floor of the roaster bowl as a result of the upward incline of the blade's bottom surface.

In addition to providing the herein-described features and benefits during the mixing/roasting/glazing processes of nut roaster assembly 100 of the present invention, the blades of agitator 230 also have a structure that prevents or at least minimizes the likelihood that the agitator seizes (i.e., gets stuck to the roaster bowl) after usage. That is, if the ingredients, which includes sugar (i.e., "sugar mixture"), remaining in the roaster bowl sufficiently cool, the 5° angle of the bottom surface of each of the blades reduces the tensile strength of the sugar mixture, thus allowing the agitator to be removed from the roaster bowl without having to add more water and reheat the mixture that remains within the roaster bowl. The angle of the bottom surface similarly prevents seizing of the agitator during mixing operations.

Extensive testing of the inventive nut roaster using the herein-described agitator blade, which included thirty consecutive production cycles without running any cleaning cycles, resulted in no instances of seizing.

Accordingly, agitator 230 provides various features, benefits and advantages over currently existing agitators, which include at least the following. Agitator 230 minimizes the thickness of the coating of hard sugar build-up that may form on the agitator's blades. Agitator 230 prevents/minimizes build-up of sugar from the underside of the blades, which in turn prevents blade seizure during operation. Agitator 230 provides enhanced mixing of the nut mixture during the mixing/roasting/glazing processes, and minimizes waste in the form of scrap. Agitator 230 prevents/minimizes the likelihood of seizing after cooking, that is, after the roaster bowl has cooled.

Moreover, the agitator blades may have angles different than that described above. In particular, while a top surface angle of 30° provides a high quality product, other angles may be employed. For instance, a top surface angle in the range of 20° and 50° can be employed. Similarly, the relief angle of the lower surface of each blade may be greater than 5° (e.g., 7°, 9°).

(E) Smart Cleaning Cycle

Steam-cleaning during the herein-described clean cycle entails boiling water within roaster bowl 200 with cover 300 on the roaster bowl in order to clean the roaster bowl including its pouring lip, the agitator, and the cover. The nut roaster assembly of the present invention may employ a smart cleaning cycle within this process to ensure that the water within the roaster bowl is indeed boiling, preferably for at least 90 seconds, if not more, regardless of where the nut roaster assembly is being used.

More particularly, the smart cleaning cycle is pre-programmed to ensure that water used in the cleaning process is maintained at its boiling point for at least 90 seconds at all altitudes where nut roaster assembly 100 may be used, regardless of the fact that water boils at different temperatures at different altitudes.

Nut roaster assembly 100 includes a processor pre-programmed to use logic to first determine whether the actual water within the roaster bowl has reached the boiling point (wherein such boiling point is a function of the altitude at which nut roaster assembly 100 currently is located). To achieve this, the temperature of the roaster bowl is monitored using temperature sensor 196 (shown in FIG. 6B) during the entire time the nut roaster assembly's heater is on. By sensing the temperature of the roaster bowl, the temperature of the roaster bowl and its liquid content (i.e., water) is monitored. As the temperature of the water increases (due to the heater being on), the sensed temperature likewise will increase. The temperature of the water will continue to gradually increase, as it is being heated, until the water begins to boil, at which point the temperature of the liquid water will not meaningfully increase. Water at the top that reaches or exceeds the boiling point converts to steam.

Accordingly, the processor tracks the sensed temperature of the roaster bowl (and thus its liquid water content), and continuously determines/ascertains whether the sensed temperature has not increased or decreased by more than 5° F. for a period of at least 30 seconds. 30 seconds is utilized to ensure that the boiling point is reached. The processor continues these processing steps until it has ascertained that the sensed temperature has remained constant (i.e., not increased or decreased by more than 5° F.) for a period of 30 seconds, at which point, the processor deems that the water is indeed boiling.

The processor then controls the nut roaster assembly to continue to heat the nut roaster and to begin a countdown timer of at least 90 seconds. As the timer counts down from 90 seconds to zero, the water within the roaster bowl continues to boil, thus providing the herein-described steam-cleaning for at least 90 seconds (and most likely longer as a result of some boiling occurring during a portion of the 30 second period discussed above). When the countdown timer reaches zero, the heater is automatically turned off, the water remaining in the roaster bowl shortly stops boiling and steam-cleaning is complete.

As illustrated from the foregoing discussion, the smart cleaning cycle of the present invention enables the inventive nut roaster assembly to be properly steam cleaned for at least 90 seconds regardless of the altitude at which the nut roaster assembly is located. By providing steam cleaning for at least 90 seconds, all or nearly all of the sugar adhered to the roaster bowl, agitator and cover is broken down, thus making cleaning of these components easy.

As part of the herein-described smart cleaning cycle, nut roaster assembly 100 preferably includes protection against excessive temperatures due to prolonged heating of a roaster bowl that is empty or otherwise contains no water. For instance, if during the smart cleaning cycle an empty roaster bowl is continuously heated, it may rise to a temperature that would lead to unit failure or an unsafe thermal point of the roaster bowl, and/or be a result of improper operation of the nut roaster assembly (e.g., initiating the smart cleaning cycle without first adding water).

Accordingly, if the nut roaster assembly's processor, as it tracks the sensed temperature of the roaster bowl in the herein-described smart cleaning cycle, ascertains that the sensed temperature exceeds 250° F., the processor shuts off the heater and provides an over-temperature error on front panel 500. Since water boils at temperatures well below 250° F. at any altitude (i.e., water boils at 212° F. at sea level, and at lower temperatures at all altitudes above sea level), selecting 250° F. as the shut-off temperature will not impact proper operation of the smart cleaning cycle while the nut roaster assembly of the present invention is operated at any location.

(F) Front Panel Display

Front panel 500 is shown in FIG. 5.

The above-discussed processor is coupled via appropriate electronic circuitry to the various inputs and displays of front panel 500. In addition, the nut roaster assembly of the present invention includes memory and other electrical components, including a power cord, to facilitate the operation of the assembly as described herein. For instance, the nut roaster assembly may include a circuit board that includes a suitable processor, memory, and other electronic devices, along with appropriate input and output for connection to front panel 500. Since the structure, design and programming of such devices are well within the knowledge and ability of those of ordinary skill in the art, given the description herein, further details about the processor and other electronics are not provided.

As shown in FIG. 5, front panel 500 includes Main Power On/Off switch 510 for turning the nut roaster assembly on and off. Front panel 500 also includes a System Status display 520 that has three indicator lights (or lamps): (a) a Heat On lamp 522; (b) a Motor On lamp 524; (c) and an Error lamp 526. These lamps respectively identify to the operator as to whether the heat is on or off, whether the motor is on or off, and whether there is an error. An error is indicated if temperature sensor 196 is broken or an over-temperature thermostat 198, shown in FIG. 6B, has detected a temperature above 450° F. or is broken. If Heat On lamp 522 is on, the operator should assume that the roaster bowl is hot and therefore not be touched without gloves or without taking other precautionary measure.

The START button 560 on front panel 500 initiates the cooking cycle, that is, initiates the mixing/roasting step (i.e., turns on the nut roaster's motor and heater) as discussed herein. The Stop button 570 may be depressed to discontinue the cooking cycle early, discontinue the cleaning cycle early, or discontinue motor and heater operation if and when otherwise desired.

The Actual Temperature display 530 on front panel 500 shows the temperature measured by sensor 196 that is mounted to the underside of the roaster bowl, and generally enables the operator to determine that cooking and cleaning is progressing correctly. Time Remaining display 540 on front panel 500 informs the operator as to when he/she needs to return to the nut roaster in order to complete the nut roasting/glazing process. A buzzer that is disposed internal to the roaster's housing alerts the operator of when to add water in order to glaze the finished nut batch. The buzzer continues to sound until the operator returns to the machine and depresses the Mute Buzzer button 550. If desired, the operator can change the volume of the buzzer by depressing a Buzzer Volume button 552. The buzzer volume cycles, with each depression of Buzzer Volume button 552, through low, middle and high volumes.

Front panel 500 also includes service technician controls to allow for adjustment of both the temperature set point and the batch timer functions. In particular, front panel 500 includes a set of service technician control buttons and displays 590 that enable a service technician to adjust the temperature at which the heater automatically shuts off as well as the number of seconds to wait until the buzzer sounds to initiate glazing.

Front panel 500 further includes the above-mentioned "Clean" button 580 to initiate the cleaning cycle of the present invention.

While front panel 500 in FIG. 5 shows switches and displays in particular locations, the locations of such switches and displays may be different than that shown.

(G) Additional Features

Shield/Protection against Sludge

The roasting and glazing apparatus of the present invention employs an upwardly extending drive shaft 116 to rotate agitator 230 within roaster bowl 200, as previously described. As shown in FIGS. 6A and 6B, drive shaft 116 extends upward from gearbox 114.

Nut roaster assembly 100 employs several components to prevent, or at least minimize, sugar-based residue typically called sludge and other materials used/created during the herein-described processes from entering gearbox 114. For convenience, the term sludge herein refers also to other materials used/created that may enter the gearbox. In particular, the present invention prevents or minimizes sludge from traveling from inside roaster bowl 200 onto and down drive shaft 116, and into gearbox 114, thus preventing potential damage to the gearbox and other components within the nut roaster housing 110.

As shown in FIGS. 4B and 6C, a bushing 188a is disposed around drive shaft 116 at the top of the roaster bowl's center column 202. Bushing 188a prevents or at least minimizes the amount of sludge that slides down drive shaft 116. Bushing 188a also properly aligns drive shaft 116 within center column 202. Bushing 188a may be a PTFE bushing or other suitable component. Bushing 188a includes a portion 188a1 on its top surface (see FIG. 6C) that prevents bushing 188a from falling downward on drive shaft 116. To prevent bushing 188a from lifting upward, the inner surface of the roaster bowl's center column 202 where it contacts bushing 188a is rough so that bushing 188a and center column 202 remain frictionally engaged to one another.

Drive shaft 116 also includes a main shaft bearing 188b disposed beneath bushing 188a, as shown in FIG. 6C. Main shaft bearing 188b aligns drive shaft 116 and provides unrestricted rotation of drive shaft 116 within the roaster bowl's center column 202. Main shaft bearing 188b is held in place by its frictional engagement with the inner surface of center column 202. Main shaft bearing 188b also is maintained in position around drive shaft 116 by shelf 202a, which extends inwardly from center column 202 and is located immediately beneath main shaft bearing 188b.

For purposes of illustration, bushing 188a (along with portion 188a1) and main shaft bearing 188b shown in FIG. 6C are identified in FIG. 6A as reference element 188.

Figure 29:
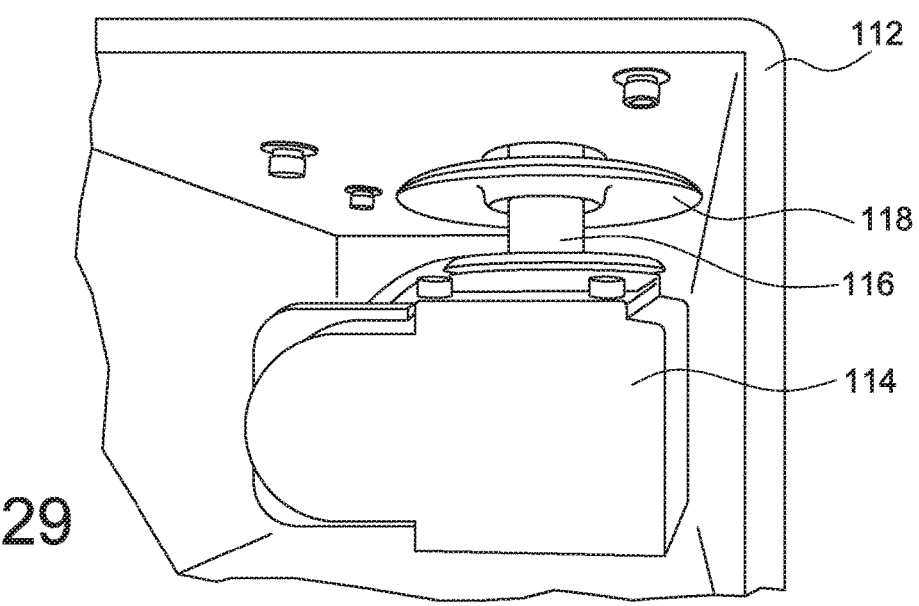
FIG. 29 is a schematic illustration showing a shield disposed on the drive shaft of the roasting and glazing apparatus/assembly in accordance with the present invention.

Nut roaster assembly 100 further includes an umbrella-shaped shield 118 disposed on drive shaft 116 immediately above gearbox 114, as shown in FIG. 29 and also shown in FIGS. 6A and 6B. Shield 118 includes a round top surface that slopes downward from its center in all directions so that materials flowing or falling onto it are directed outward. Shield 118 may be plastic or other appropriate material. Shield 118 installed on drive shaft 116 may employ an O-ring or other appropriate component to seal shield 118 to drive shaft 116.

At all times, that is, during operation of nut roaster assembly 100 and when nut roaster assembly 100 is not in use, shield 118 prevents sludge and other materials that happen to flow down drive shaft 116 from entering gearbox 114. Instead, shield 118 redirects the sludge and other materials outwardly and away from gearbox 114. Accordingly, shield 118 prevents sludge and other potentially harmful components from entering gearbox 114.

Dampening Cone

Nut roaster assembly 100 includes a vibration dampening mechanism that dampens the vibration of roaster bowl 200 during operation.

FIGS. 6A, 6B, 17, 20 and 21 show a rubber dampening cone 172 mounted on the underside of bowl assembly 180 (immediately beneath gearbox 114 as shown in FIG. 6A). When nut roaster assembly 100 is operating (during the mixing/roasting/glazing processes or cleaning process), roaster bowl 200 is at the fully lowered position. In such position, and as shown in FIGS. 6A, 6B and 21, dampening cone 172 is resting on cross member 170 of housing 110. Hence, dampening cone 172 prevents roaster bowl 200 from moving below the herein-described fully lowered position. Dampening cone 172 also reduces vibration and noise that may otherwise be generated when the motor is operating.

Adjustable Feet

Nut roaster assembly 100 preferably includes adjustable feet 194, as shown in FIG. 1. By employing adjustable feet 194, the height of each of the corners of nut roaster assembly 100 may be modified as needed. The height may be modified to ensure that nut roaster assembly 100 rests squarely on all of its feet, which beneficially reduces vibration/noise. Countertops on which the unit rests may not be completely flat, or the unit may be resting on multiple, uneven surfaces, thus requiring height adjustment of one or more of the adjustable feet.

In addition, by having raised, adjustable feet, the surface of the table/counter on which nut roaster assembly 100 rests may be cleaned without having to lift or otherwise move the unit, which is somewhat heavy.

From the foregoing discussion, it is seen that the invention entails an easy to use and safe machine that can be operated by non-highly skilled persons to produce high quality roasted and glazed nuts and other food items. It is noted that the details of various components are not set forth herein, since such components, their control and operation are well within the knowledge of those of ordinary skill in the art. For instance, the present invention employs a heater, a motor, and other electro-mechanical components to carry out certain functions and operations. Heaters, motors, etc. are well known and thus a variety of such devices may be employed. In connection with the type of heater that may be used within the present invention, an electrically powered heater may be employed, thus allowing the inventive roasting and glazing apparatus to be located at any location in which electrical power is available (e.g., within any retail store, home, factory, etc.) However, a gas heater may be utilized, if desired.

Moreover, the roasting and glazing apparatus of the present invention is sufficiently small to be used on a table top surface and is easily moved from one location to another, such as from one room to another room within a retail facility, from one retail facility to another, from an inside location to an outside location (and vice versa), etc. Hence, so long as a suitable power source is available, the inventive roasting and glazing apparatus is not confined to a single location and, thus, is portable. Accordingly, the inventive roasting and glazing apparatus is designed for use in a retail environment.

In addition, the invention includes various aspects and features, including: (A) Cover with Liquid Dispersing Design; (B) Bowl Movement: Cantilever with Pistons; (C) Steam Cleaning and Detachable Pour Tray; (D) Agitator and Bowl; (E) Smart Cleaning Cycle; (F) Front Panel Display; and (G) Additional Features, all as described herein. All of these aspects and features may be embodied within a single device, but the invention includes employing some, but not all, of these aspects and features within an apparatus. For instance, the present invention includes an assembly (and process carried out by that assembly) that incorporates only groups (A) and (B) mentioned above (i.e., Cover with Liquid Dispersing Design, and Bowl Movement: Cantilever with Pistons). As another example, the present invention includes an assembly (and process carried out by that assembly) that incorporates only groups (C) and (E) (e.g., Steam Cleaning and Detachable Pour Tray, and Smart Cleaning Cycle). Other combinations of groups also are part of the present invention.

Moreover, the present invention includes a device (and corresponding process) that incorporates only one of these groups (or a portion of a group), such as only group (A) (i.e., Cover with Liquid Dispersing Design). Accordingly, the invention includes a machine that employs the cover for use with other equipment that may not perform roasting. As another example, the invention entails a machine that employs only group (D) (i.e., Agitator and Bowl), in which the particular structure of the agitator described herein is used within a machine that does not necessarily include or otherwise carry out other functions described herein. As a further example, the invention includes only group (B) (Bowl Movement: Cantilever with Pistons) in which a machine that employs the inventive lifting/lowering features, as described herein, does not employ the agitator described herein and/or other components/functions not related to the lifting/lowering of a bowl. These examples are provided for illustrative purposes and are not intended to limit the invention solely to those examples identified herein.

Having described the invention in detail, the following is a list and brief description of some of the features and benefits of the inventive roasting and glazing apparatus described herein.

(1) Double gas pistons: Enables easier raising of roaster bowl.

(2) Double gas pistons provided for improved safety during lowering: A first piston prevents the roaster bowl from dropping from fully raised (emptying) position. When lowering past the 30° position, a second piston provides resistance, thus requiring the operator to exert sufficient downward force on the cantilever arm to secure the roaster bowl all the way into the nut roaster housing. Hence, a high level of safety is provided.

(3) Clean mode added for convenience: No need to monitor the machine while in the clean mode.

(4) Combination of bowl with pouring lip and cover: These components, when combined, improve the user's ability to clean the roaster bowl, pouring lip, agitator and cover.

(5) Roaster bowl contains a pouring lip: After cleaning the roaster bowl, water is fully directed onto the detachable pour tray.

(6) Detachable pour tray: Directs hot water and prevents spillage onto counter or underneath nut roaster assembly. Restricts back flow of water into nut roaster housing.

(7) Digital temperature readout: Useful to the operator as well as service personnel to verify proper temperature of roaster bowl during various stages of cooking and cleaning.

(8) Uniquely designed roaster cover: Cover contains a liquid reservoir with metering holes that regulate liquid flow into hot roaster bowl and is used when adding water for the glazing step. This prevents the rush of sugar-laden steam that can burn the operator. By minimizing the rush of sugar-laden steam and by controlling its direction, the coating of sugar on surrounding surfaces, including walls and ceilings, is minimized.

(9) Uniquely designed roaster cover: Holes in the water reservoir are far enough away from the cover handle to minimize injury due to escaping steam.

(10) Steam vent on the side of the roaster cover: Steam vent faces the pouring lip to direct steam away from operator during both the glazing and cleaning processes. The steam also loosens sugar build up on the bowl's pouring lip for easier cleaning.

(11) Smart Cleaning Cycle: Nut roaster assembly ascertains whether water within the roaster bowl is boiling, regardless of the actual boiling point (which depends on altitude) so that the cleaning cycle can be automated regardless of the altitude at which the nut roaster assembly is used.

(12) Uniquely designed agitator: Reduces scrap; prevents seizing; promotes even coating of nuts.

(13) Agitator is easily removable: Adds to the ease of cleaning.

(14) Gearbox shield: Use of shield on drive shaft prevents sludge from entering and damaging gearbox.

(15) Rubber dampening cone inside nut roaster housing: During roasting, glazing and cleaning, the rubber cone fixed at the bottom of the roaster bowl assembly minimizes vibration.

(16) Nut roaster sits on raised adjustable feet: Allows for proper alignment of unit and easier cleaning under the nut roaster.

It is appreciated that while the present invention has been described with reference to specific schematics, diagrams, and descriptions, various changes may be made without departing from the spirit and scope of the invention.

For example, certain configurations of various components of the inventive nut roasting and glazing apparatus have been described herein and illustrated in the figures, but the configuration may be modified as would be appreciated by those of ordinary skill in the art. For example, the configuration of the apparatus may be reversed so that, for illustrative purposes, the steam vent is disposed on the left side of the unit (and, similarly, all other components are reversed in configuration). As another example, the precise shape of various components is not critical to the invention herein, including the shape of the sides of the pour tray (e.g., the sides may be curved or have another shape), the shape and configuration of the front display panel, the shape of the cantilever arm, etc.

As another example, the present invention has been described in connection with a roaster bowl and other components having specific sizes. But the sizes may be modified, as would be appreciated by those of ordinary skill in the art. For instance, various amounts of water are identified for addition to the roaster bowl during the cooking and cleaning processes. These amounts are the preferred amounts for a particular roaster bowl size. But other amounts may be employed. Moreover, the roaster bowl may be larger or smaller than that shown and described herein and, thus, the water amounts may be modified to accommodate a different size roaster bowl.

Still further, other variations may be made as would be appreciated to those of ordinary skill in the art. Therefore, it is to be understood that other expedients/variations may be employed but that stay within the meaning, scope and spirit of the invention.

Having described the present invention including various features and variations thereof, it is intended that the appended claims be interpreted as including the embodiments described herein, the alternatives mentioned above, and all equivalents thereto.

What is claimed is:

1. A method of preparing a food mixture, comprising:
   assembling a cover and a roaster bowl containing a food mixture, the roaster bowl having a bottom portion, an agitator mounted to the bottom portion, an upper edge, and a pouring lip extending from the upper edge, the cover having a top surface defining a boundary of a peripheral water reservoir disposed on a first side of the cover, and a side surface extending from the top surface, around an upper perimeter of the cover, to a bottom edge, wherein the bottom edge extends around a lower perimeter of the cover, and includes a rolled edge along a first portion of the lower perimeter, and a non-rolled edge along a second portion of the lower perimeter between opposite ends of the rolled edge,
   wherein, in an assembled configuration of the cover and the roaster bowl, (i) the rolled edge of the cover provides a seal with the upper edge of the roaster bowl along the first portion of the lower perimeter of the cover, and (ii) the non-rolled edge of the cover, the opposite ends of the rolled edge of the cover, and the pouring lip of the roaster bowl together define a single steam vent on a second side of the cover opposite the first side, and coextensive with the non-rolled edge;
   flowing liquid water, through at least one metering hole in the water reservoir, into the roaster bowl, to the food mixture while rotating the agitator, wherein the liquid water interacts with the food mixture to form a glaze on the food mixture, and wherein at least a portion of the liquid water is converted into steam; and
   venting at least some of the steam through the single steam vent.

2. The method of claim 1, wherein the food mixture is sugar-coated nuts.

3. The method of claim 1, wherein the liquid water flows at a flow rate of 0.09 to 0.3 ounces per second.

4. The method of claim 1, wherein the roaster bowl defines a circumferential channel around a portion of the upper edge of the roaster bowl, the circumferential channel configured to receive the rolled edge of the cover to provide the seal along the first portion of the lower perimeter of the cover, and to prevent the steam from escaping from the roaster bowl except through the single steam vent along the second portion of the lower perimeter of the cover.

5. The method of claim 1, further comprising:
   raising the roaster bowl sufficient to cause the glazed food mixture within the roaster bowl to pour over the pouring lip of the roaster bowl.

6. The method of claim 1, further comprising:
   prior to assembling the cover and roaster bowl, heating the food mixture in the roaster bowl to melt sugar in the food mixture, wherein the melted sugar adheres to nuts in the heated food mixture.

7. The method of claim 1, wherein the roaster bowl and the cover both have a round shape.

8. The method of claim 1, wherein the cover has a handle coupled to and extending upwards from a center of the top surface of the cover, and wherein a radial distance from the rolled edge to the handle is larger than a radial distance from the non-rolled edge to the handle.

9. The method of claim 1, further comprising:
   pouring out the food mixture through the pouring lip, wherein the pouring lip extends radially outward and upward from the upper edge of the roaster bowl.

10. The method of claim 8, wherein the water reservoir is narrow, curved, and disposed adjacent the upper perimeter of the cover, such that a radial distance from any point in the water reservoir to the handle is greater than a radial distance from any point in the water reservoir to the side surface of the cover.

11. The method of claim 1, wherein the water reservoir is a separate component from the top surface of the cover, and has a raised edge disposed above the top surface of the cover.

12. The method of claim 1, wherein the top surface of the cover defines the water reservoir such that the water reservoir is integrated with the cover.

13. The method of claim 1, wherein the non-rolled edge of the bottom edge of the cover is disposed radially inward relative to the rolled edge such that the single steam vent is defined circumferentially between the opposite ends of the rolled edge, and radially between the non-rolled edge and the pouring lip.

14. The method of claim 1, further comprising:
   prior to assembling the cover and the roaster bowl, heating the roaster bowl and mixing water, sugar, and nuts in the roaster bowl to sugar coat the nuts and form the food mixture without the cover on the roaster bowl.

15. The method of claim 14, further comprising:
   during mixing of the sugar and nuts in the roaster bowl to sugar coat the nuts, rotating the agitator without the cover on the roaster bowl.

16. The method of claim 1, wherein the steam vented through the single steam vent is vented toward a bottom portion of the pouring lip.

* * * * *